United States Patent [19]

Otsuka et al.

[11] Patent Number: 4,538,184

[45] Date of Patent: Aug. 27, 1985

[54] METHOD AND APPARATUS FOR PROCESSING VIDEO SIGNALS

[75] Inventors: Hirotaka Otsuka, Kawasaki; Katsuo Nakazato, Tokyo; Kunio Sannomiya, Atsugi; Hidehiko Kawakami, Tokyo; Hiroyoshi Tsuchiya, Kawasaki; Hideo Uchida, Tokyo, all of Japan

[73] Assignees: Matsushita Electric Industrial Company, Limited; Matsushita Graphic Communication Systems, Inc., both of Japan

[21] Appl. No.: 501,873

[22] Filed: Jun. 7, 1983

[30] Foreign Application Priority Data

| Jun. 7, 1982 [JP] | Japan | 57-97938 |
| Jun. 18, 1982 [JP] | Japan | 57-106063 |
| Sep. 29, 1982 [JP] | Japan | 57-171643 |

[51] Int. Cl.³ .................................... H04N 1/40
[52] U.S. Cl. ........................ 358/283; 382/50
[58] Field of Search ............ 358/280, 282, 283; 382/27, 9, 41, 50, 54, 56

[56] References Cited

U.S. PATENT DOCUMENTS

| 4,258,393 | 3/1981 | Eijiri et al. | 358/283 |
| 4,403,257 | 9/1983 | Hsieh | 358/283 |

FOREIGN PATENT DOCUMENTS

| 0033623 | 8/1981 | European Pat. Off. |
| 2049345 | 12/1980 | United Kingdom | 358/283 |

OTHER PUBLICATIONS

D. R. Thompson "Digital Halftone Method For Matrix Displays" I.B.M. Technical Disclosure Bulletin vol. 20, No. 1, 6/77.

D. R. Thompson "Halftones Combining Spatial And Temporal Modulation" IBM Technical Disclosure Bulletin vol. 25, No. 7B, 12/82.

IBM Technical Disclosure Bulletin, vol. 26, No. 5, Oct. 1983 pp. 2516-2518, "Correcting Non-Linear Distortions In The Scanning And Printing Process" B. W. Wade and K. Y. Wong.

Primary Examiner—Howard W. Britton
Assistant Examiner—Edward L. Coles
Attorney, Agent, or Firm—Lowe, King, Price & Becker

[57] ABSTRACT

A method for processing a video signal comprises defining a successively shifted scan window with respect to the signal level of each picture element from which said video signal has been derived, totalizing the quantum numbers of the picture elements in the scan window corresponding to the original screen dot, and reconstructing black picture elements corresponding to the total value of the quantum numbers faithfully to the area of the original dot, and an apparatus for carrying out the method.

6 Claims, 70 Drawing Figures

| 0 | 0 | 0 | 0 | 0 |
|---|---|---|---|---|
| 0 | 25 | 36 | 0 | 0 |
| 0 | 85 | 100 | 5 | 0 |
| 0 | 25 | 36 | 0 | 0 |
| 0 | 0 | 0 | 0 | 0 |

B

| 0 | 0 | 0 | 0 | 0 |
|---|---|---|---|---|
| 0 | 0 | 100 | 0 | 0 |
| 0 | 100 | 100 | 0 | 0 |
| 0 | 0 | 12 | 0 | 0 |
| 0 | 0 | 0 | 0 | 0 |

C

| 0 | 0 | 0 | 0 | 0 |
|---|---|---|---|---|
| 0 | 0 | 12 | 0 | 0 |
| 0 | 100 | 100 | 0 | 0 |
| 0 | 0 | 100 | 0 | 0 |
| 0 | 0 | 0 | 0 | 0 |

FIG. 20

|  | +0 | +1 | +2 | +3 | +4 | +5 | +6 | +7 | +8 | ----- | +n |
|---|---|---|---|---|---|---|---|---|---|---|---|
| (ADDR 2) | +0 | +1 | +2 | +3 | +4 | +5 | +6 | +7 | +8 | ----- | +n |
| (ADDR 1) | +0 | +1 | +2 | +3 | +4 | +5 | +6 | +7 | +8 | ----- | +n |
| (ADDR 0) | +0 | +1 | +2 | +3 | +4 | +5 | +6 | +7 | +8 | ----- | +n |

3×3 MATRIX — 92

(CNVA2) = (ADDR2) + 4
(CNVA1) = (ADDR1) + 4
(CNVA0) = (ADDR0) + 4

| (CNVA2) | (CNVA2) + 1 | (CNVA2) + 2 |
|---|---|---|
| (CNVA1) | (CNVA1) + 1 | (CNVA1) + 2 |
| (CNVA0) | (CNVA0) + 1 | (CNVA0) + 2 |

93

| E9 | E8 | E7 |
|----|----|----|
| E6 | E5 | E4 |
| E3 | E2 | E1 |

FIG. 24
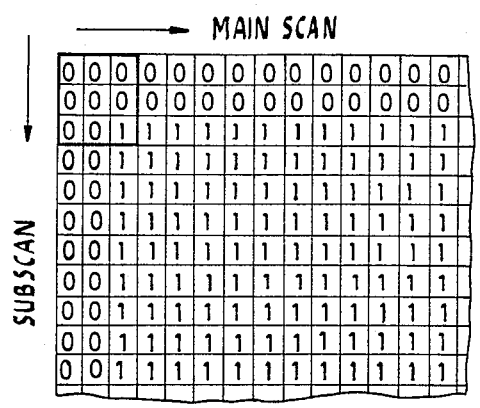
A
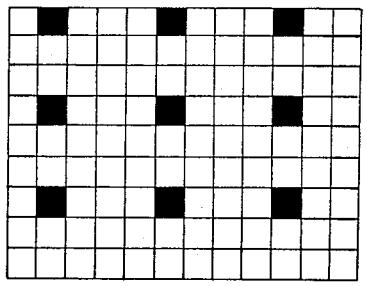
B
C

METHOD AND APPARATUS FOR PROCESSING VIDEO SIGNALS

BACKGROUND OF THE INVENTION

The present invention relates to a method and apparatus for processing video signals such as facsimile or the like signals and reconstructing the original through a conventional recording system.

In digital systems where the video signal is converted into digital samples, the picture quality of the digitized image tends to be affected considerably by a moire pattern resulting from interference beats between a periodic pattern present in the original and a patteren generated as a result of the quantization.

The recent rapid growth in facsimile communications have created various demands not only for transmitting documents, but also a wide variety of pictorial images having inherent periodic patterns. In particular, if the original has a fine periodic structures such as textures, the periodic patterns interfere with the periodic intervals with which the original is scanned, producing a moire pattern in a reconstructed image. This imposes limitations on the capability of a facsimile communication system. To overcome this difficulty various attempts have been made to increase the scan density and to provide variable density scan with an attendant increase in cost. The following is a description of the disadvantages associated with the facsimile transmission of screen dot photographs currently employed by newspaper companies.

The screen dot photograph is made up of a multitude of black dots and their arrangement defines the image. The current method involves segmenting the dot into a matrix of squares and quantizing the black area of the square and assigning to it a specific quantum number. If the assigned quantum number is smaller than a threshold value of 50, for example, the square is taken as white and if it exceeds a threshold 51 it is treated as black. The original dot is thus represented by a plurality of squares or picture elements and the number of such elements depends on the relative size and position of each square in the original dot.

Because of the quantization the reconstructed image is an approximation of the original and differs significantly in some squares where the number of dots contained therein is near the threshold values. The difference in dot number between the original and the reconstructed image reprepsents a difference in average image density.

Moire patterns would appear in a reconstructed image when it contains a series of squares that vary periodically in average density even if the original dots have a uniform distribution. One approach to making the moire pattern less noticeable to the eyes would be to achieve uniformity in average image density if the original dots have a uniform distribution.

Eliminating the moire pattern could be achieved by scanning the original with a tiny spot much smaller than the dot size since it minimizes errors and thus reduces point-to-point variation in image density. However, the amount of digitized samples increases in proportion to the square value of the number of scan lines and results various disadvantages including an increase in data processing time, system complexity, low transmission line efficiency and a large memory capacity for a system of the type where a screen memory is employed for processing. The scan density has therefore been chosen to minimize the effect of moire patterns so that such patterns are less noticeable to the eyes. For example, the square size is chosen to be a submultiple of the dot size and squares are aligned parallel with dots to minimize the deviation of the reconstructed dot shape from the original. However, this approach proves unsatisfactory because the dots are not necessarily aligned in desired directions and their size and shape vary from print to print.

On the other hand, demands have arisen to transmit halftone images through binary coded signals. A typical example of this type of transmission involves the use of dither method. However, the dither method is not satisfactory for discretely valued images such as screen dot photographs, documents and line drawings, while it is satisfactory to halftone images.

SUMMARY OF THE INVENTION

A first object of the present invention is therefore to provide a method and system for processing video signals which derives binary data that produce no moire patterns or interruptions which might otherwise occur in reconstructed line drawings. A second object of the invention is to a method and system for processing video signals which is satisfactory for halftone image reconstruction on binary data. A third object of the invention is to achieves the first and second objects by means of a single means at the same time. Therefore, the invention is suited for applications in which different types of images including halftone and discrete-valued images, are mixed.

The present invention provides a method for processing a video signal which comprises a first step of storing a video signal derived from each picture element of a scanned original into a video signal memory, a second step of establishing a scan window in said memory such that the scan window comprises M picture elements adjacent to each other (where M is a natural number), a third step of determining the total sum S of the signal levels of all of said picture elements in said scan window and determining N and A which satisfy the following formula:

$$S = C \times N + A$$

where C represents a given video signal level, N is an integer and $0 \leq A < C$, and a fourth step of identifying each of said picture elements in said scan window with a number arranged in the order of signal level, either descending or ascending order, and if in the descending order, transforming the signal levels of the picture elements #1 through #N to a signal level C, transforming the signal level of the picture element #(N+1) to a signal level A, transforming the signal levels of the picture elements #(N+2) through #M to a signal level zero, and if in the ascending order, transforming the signal levels of the #1 through #(M−N−1) picture elements to zero, transforming the signal levels of the #(M−N) picture elements to A, transforming the signal levels of the picture elements #(M−N+1) through #M to C, and repeating said second, third and fourth steps with respect to all the stored areas of said memory.

In a specific aspect of the invention, the first step comprises storing the input signal derived from each picture element into an input storage area and into an output storage area, and said second step comprises establishing an input scan window in said input storage area such that the scan window comprises M picture elements adjacent to each other and establishing an output scan window in said output storage area in the same manner as said input scan window, wherein said third step is performed with respect to said output scan window and said fourth step is performed with respect to said input scan window.

In a further specific aspect of the invention, the third step comprises determining said sum S by totalizing a partial sum Sm which totals the signal levels of the picture elements in each scan window and an error correction value E while said scan window is successively shifted. The fourth step comprises:

(1) determining N and A which satisfy the formula $S' = C \times N + A$ (where, N is an integer and $0 \leq N \leq M$, and $0 \leq A < C$) if $0 \leq S < C \times M$ and transforming the signal levels of the picture elements #1 through #N in either ascending or descending order to a signal level C, the signal level of the picture element #(N+1) to the signal level A and the signal levels of the picture elements #(N+2) and thereafter to the signal level zero as a primary transformation level, comparing the signal level $P_{1st}$ of the picture element which is not included in said scan window as a result of said successive shifting to the next with a predetermined binary level V (where $0 \leq V < C$) and transforming the signal level $P_{1st}$ to C if $P_{1st}$ is greater than V or zero if $P_{1st}$ is not greater than V as a secondary transformation level $P_{2nd}$, and providing a sum of the signal levels $P_{1st}$ and $P_{2nd}$ and retaining it as said error correction value;

(2) transforming the signal levels of said M picture elements to the level zero if $0 < S$, and retaining the sum S as said error correction value for the scan window after being shfited to the next; and (3) transforming the signal levels of said M picture elements to the level C if $S < C \times M$, and retaining $S - C \times M$ as said error correction value.

BRIEF DESCRIPTION OF THE DRAWINGS

The present invention will now be described in further detail with reference to the accompanying drawings, in which:

FIGS. 6A to 6C are illustrations describing the redistribution of video data;

FIG. 20 is an illustration showing the location of addresses used in FIG. 19;

FIGS. 24A to 24C are illustrations of the processes of data conversion;

DETAILED DESCRIPTION

To facilitate understanding of the present invention reference is first had to FIGS. 1 to 4 wherein a prior art technique is illustrated.

Figure 1:
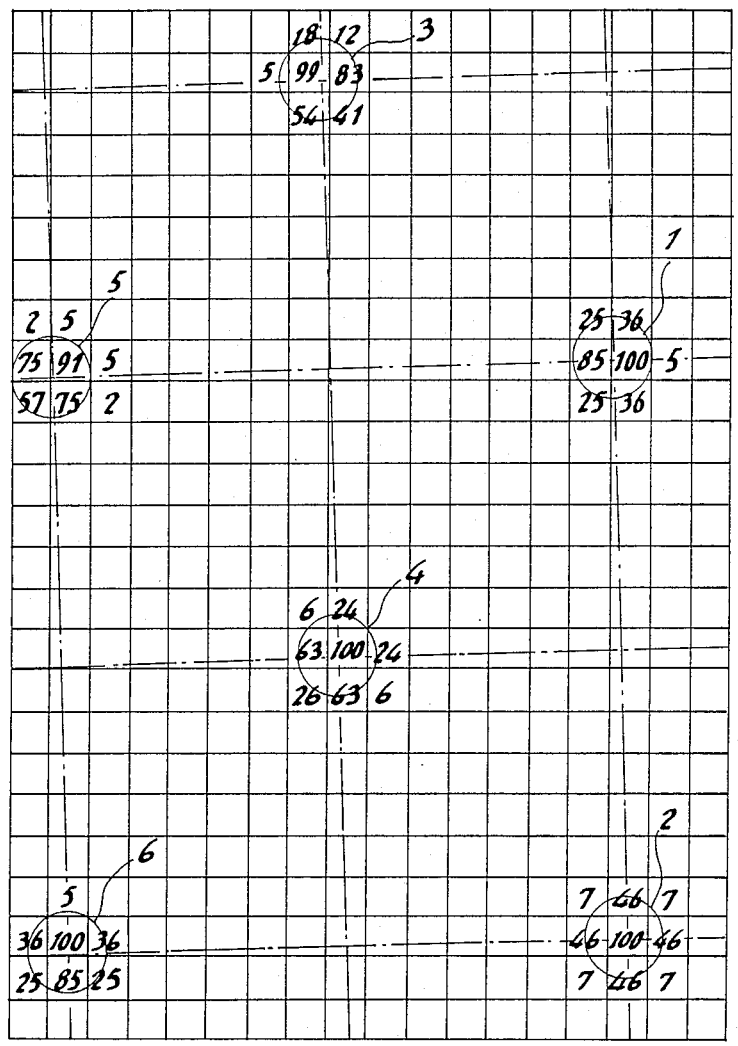
FIG. 1 is a diagram illustrating a method of quantizing screen dots.
Figure 2:
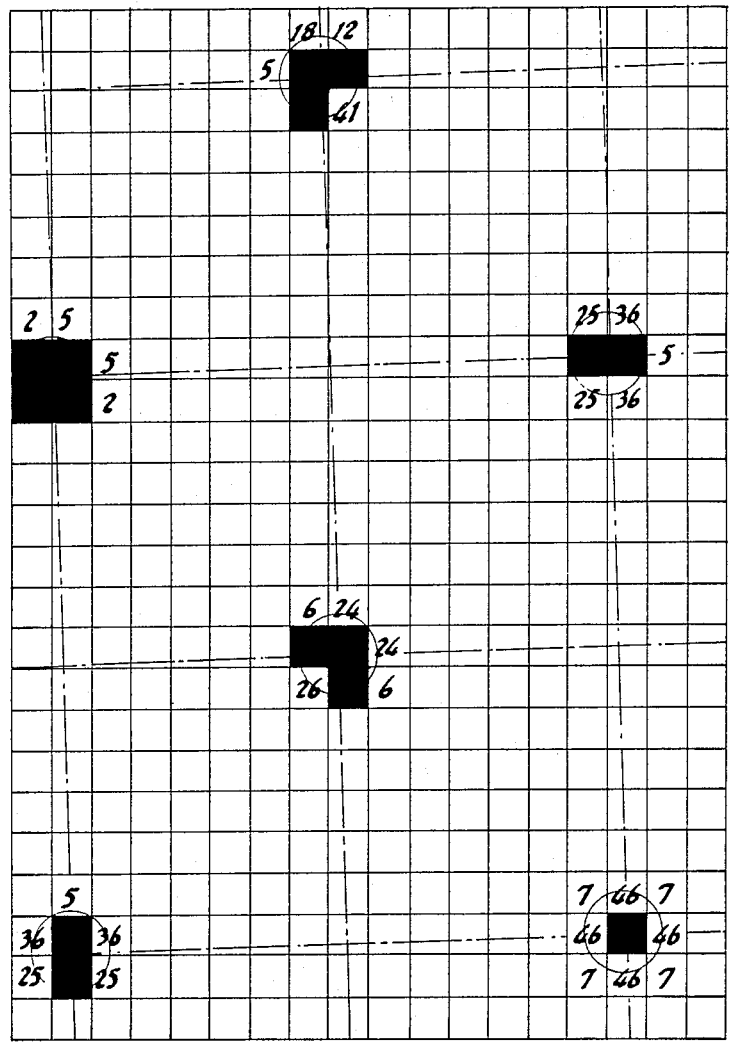
FIG. 2 is an illustration of a reconstructed view of the binary converted screen dots according to a prior art system.
Figure 3:
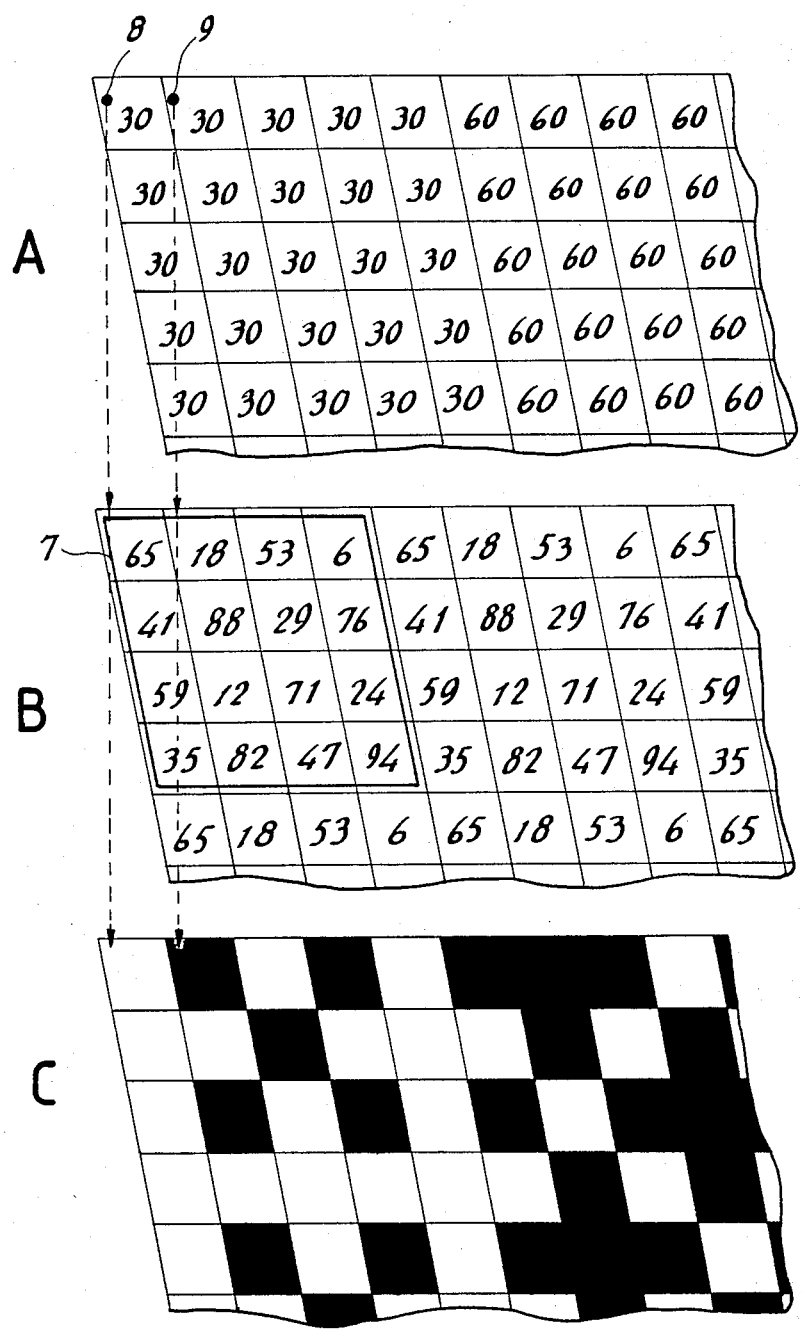
FIGS. 3A to 3C are illustrations of a process of the dither method.

In FIG. 1 black screen dots of equal size are represented by circles against the white background. The whole area of the original is segmented into a matrix of squares and the black area of each square is quantized. Each square is then assigned a binary number which is given by an equivalent decimal number such that decimal 100 is assigned to a full black square and decimal zero to a full white square (in FIG. 1 full white areas are left vacant for the sake of clarity). When reconstructed, the original image would appear as shown in FIG. 2 wherein the segmented squares are indicated by white areas corresponding to those of FIG. 1 having decimal numbers equal to or smaller than 50 and by black areas corresponding to those having decimal numbers equal to or greater than 51. It is seen that the original black dot is converted to a group of squares ranging in number from 1 to 4. Ideally speaking, the original dot should be represented by an equal number of picture elements. The difference in the number of picture elements from one dot to another stems from the fact that the average image density around each original dot differs from those of other dots. If the reconstructed image manifests variations in the number of squares for each dot and if such variations occur periodically from one point to another as shown in FIG. 2, the human visual perception will sense this periodicity as a moire pattern.

In more detail, each dot shown at 1 through 6 in FIG. 1 has an image intensity represented by a total of decimal 312. The original dot 3, for example, is reconstructed in FIG. 2 by a set of three black picture elements with a total of 300, so tha there is an error of −12 in the reconstructed image. Whereas, the original element having a quantum number 83 within the dot 3 is represented by a black square, so that an error of plus 17 exists in the reconstructed image, and the original element having a quantum number 41 is represented by a white area, so that it is erred on the side of white by 41. A total of these errors is −12 which corresponds to the value given above. It is highly likely that there is an error of $\pm\frac{1}{2}$ picture elements in the process of converting each original dot to a two-valued image which corresponds to an error ±50 in quantum number. A representation by a set of three squares as in the case of dots 3 and 4 has an error of least magnitude and can be considered as an optimum representation. However, the squares representing the original dot 5 have an excess of one square, those representing dots 1 and 6 having an excess of two squares. These errors are the potential source of moire patterns. One approach would be to reconstruct each dot with an equal number of squares.

The dither method will now be described with reference to FIGS. 3A to 3C for quantizing a halftone image into two-valued image. In FIG. 3A quantized dots are represented by a matrix of squares indicated by decimal numbers 30 and 60 as a typical example in a range of white and black levels corresponding respectively to decimal zero and 100 as described previously. In FIG. 3B is shown a matrix of threshold values with each of which the halftone value of the corresponding square in FIG. 3A is converted into one of two discrete values. The threshold value matrix comprises a recyclic pattern of a 4×4 sub-matrix of squares shown at 7 representing 16 different threshold values which are equally spaced apart between the white level of zero and the black level of 100. This pattern repeats in orthogonal directions. FIG. 3C illustrates a matrix of two-valued squares of black and white corresponding respectively to those in FIG. 3A having quantum numbers greater than the corresponding threshold values in FIG. 3B and those having smaller quantum numbers. For example, squares 8 and 9 in FIG. 3A are respectively smaller and greater than the corresponding threshold values 65 and 18 and represented by white and black squares in FIG. 3C. With the increasing value of quantum number, the number of those exceeding the corresponding threshold values increases and therefore the black areas increase. In this way, black squares are generated in proportion to the signal level of the video information on a per sub-matrix basis and averaged out into a halftone value upon visual perception.

Figure 4:
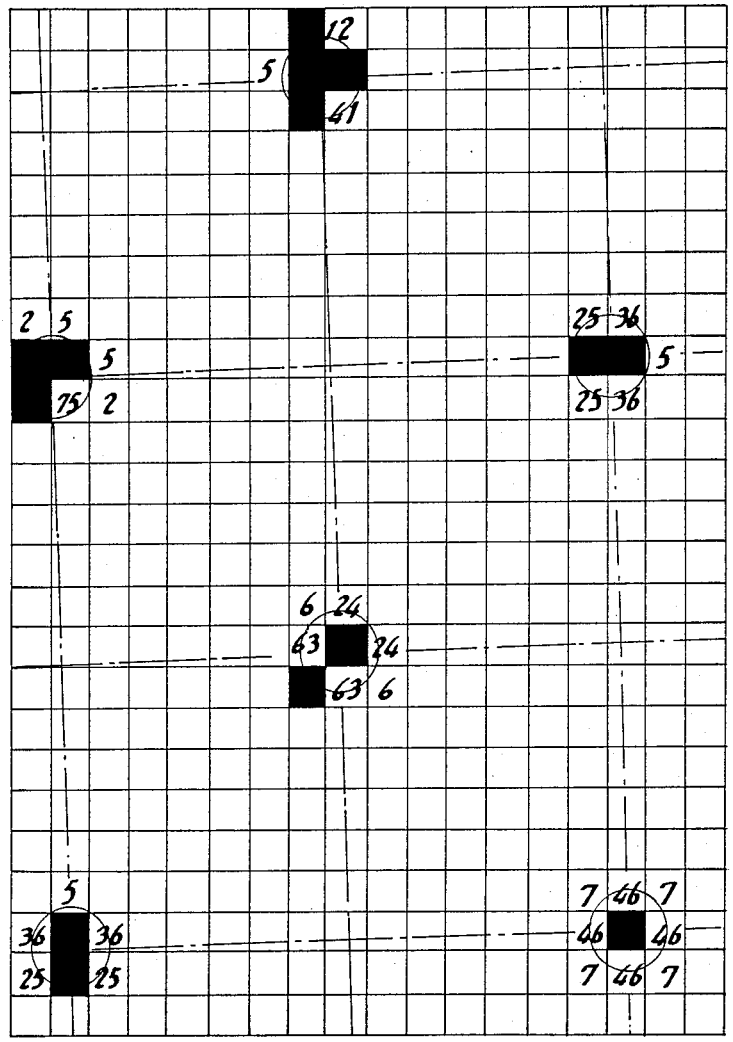
FIG. 4 is an illustration of a two-valued picture obtained by application of the prior art dither method to the screen dot picture of FIG. 1.

FIG. 4 is an illustration resulting from the application of the dither method just described to the screen dot pattern of FIG. 1. As evidenced by FIG. 4 the number of black squares for each original screen dot varies from dot to dot. Due to quantization and comparision with the dithered threshold values it is highly likely that if two-valued original image has a line width approaching the scanning line width the fine features of the resultant image will be broken at intervals and appear as a reproduction of dash-dot lines.

The following is a description of the present invention.

The video signal processing of the invention is based on the fact that the quantum numbers of the picture elements that correspond to an original dot are totalized and black squares corresponding to the total sum of the quantum numbers are additionally reconstructed so that errors resulting from the quantization of the video signal are minimized. More specifically, the total of quantum numbers for each dot is 312 in the case of FIG. 1. Since a full black element is taken as 100 quantum number, the reconstruction of the full black in the shape of a square as shown in FIG. 2 is also taken as 100 quantum number. Since the reconstructed image takes on a quantum of 100 or zero, all the picture elements are represented by 100 or 0. The original dot 3, for example, is reconstructed in FIG. 2 by a set of three black picture elements with a total of 300, so that there is an error of −12 in the reconstructed image. Whereas, the original element having a quantum number 83 within the dot 3 is represented by a black square, so that an error of plus 17 exists in the reconstructed image, and the original element having a quantum number 41 is represented by a white area, so that it is erred on the side of white by 41. A total of these errors is −12 which corresponds to the value given above. It is highly likely that there is an error of $\pm\frac{1}{2}$ picture elements in the process of converting each original dot to a two-valued image which corresponds to an error ±50 in quantum number. A representation by a set of three squares as in the case of dots 3 and 4 has an error of least magnitude and can be considered as an optimum representation. However, the squares representing the original dot 5 have an excess of one square, those representing dots 1 and 6 having an excess of two squares.

Figure 5:
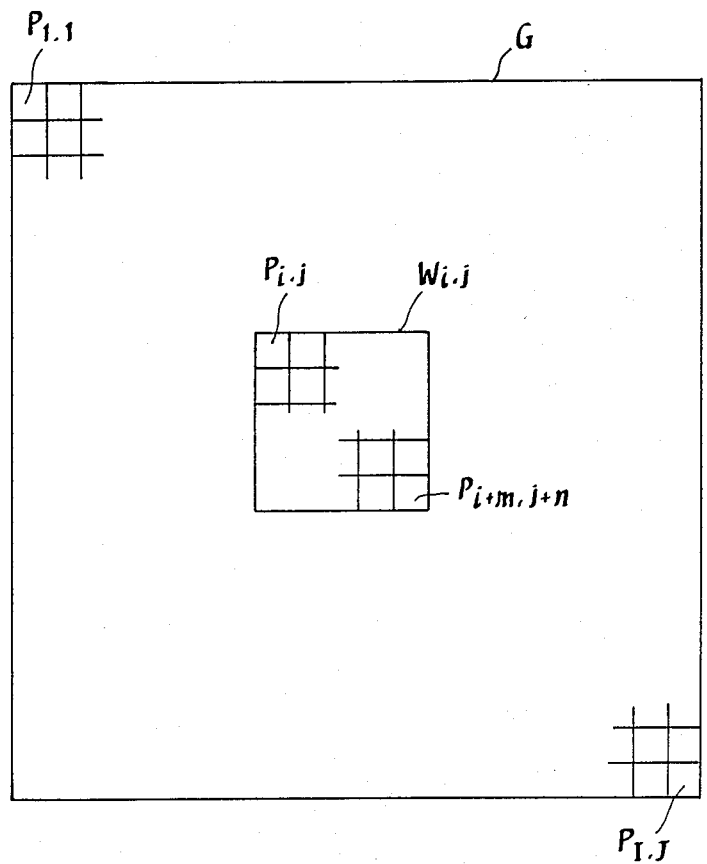
FIG. 5 is an illustration of the underlying principle of the present invention.

The underlying principle of the present invention will now be described with reference to FIG. 5.

Step (1) The original image is resolved into segments by scanning to derive a train of video signals. The video signals are stored into a memory map G in the direction of the main scan and shifted to the next scan line in the direction of the subscan. The amplitude of a signal stored in a given picture element $P_{i,j}$ (i=1 to I, j=1 to j) is denoted as $L_{ij}$;

Step (2) A scan window $W_{i,j}$ comprising a cluster of the following picture elements is established in the storage area G:

$$\begin{array}{ccc} P_{i,j} & \ldots & P_{i,j+n} \\ \vdots & & \vdots \\ P_{i+m,j} & \ldots & P_{i+m,j+n} \end{array}$$

Step (3) In respect of the signal level $L_{i+u,j+v}$ of each picture element $P_{i+u,j=v}$ (u=0 to m, v=0 to n) of a given scan window $W_{i,j}$, the following equation is calculated to obtain N and A:

$$\sum_{v=0}^{n} \sum_{u=0}^{m} L_{i+u,J+v} = C \times N + A$$

where,
C=the maximum value of signal level,
N=integer
$0 \leq A < C$.

Step(4) Denote the descending grade of the signal level $L_{i+u,j+v}$ of each picture element $P_{i+u,j+v}$ within the scan window $W_{i,j}$ as $K(P_{i+u,j+v})$;

Step (5) Transform $L_{i+u,j+v}$ to C if $K(P_{i+u,j+v})$ is equal to or smaller than N, or transform $L_{i+u,j+v}$ to A if $K(P_{i+u,j+v})$ is equal to N+1, or transform $L_{i+u,j+v}$ to 0 if $K(P_{i+u,j+v})$ is greater than N+1;

Step (6) Repeat the steps 2, 3, 4, 5 and 6 in the direction of the main scan with respect to i=1 to I-m; and Step (7) Repeat the steps 2, 3, 4, 5 and 6 in the direction of the subscan with respect to j=1 to J-n.

While mention has been made of a scan window having a group of squares, the same applies to a scan window having a group of other shapes including circles, ellipses and triangles.

Furthermore, the value C may also be chosen to a value close to the maximum level of the video signal.

While mention has been made of descending grades in the steps 4 and 5, it is also possible to use ascending grades for performing the step of transformation. Alternatively, the video signals may be successively stored into the storage area G in succession on a per scan-window basis and rewriting it with the next scan window data.

The invention will be explained using numerical values.

FIG. 6A is an illustration of a matrix around the original screen dot 1 of FIG. 1. Assume that the data contained in this matrix are all that is required to be processed. This matrix is equivalent to a matrix shown in FIGS. 6B or 6C in which the matrix of FIG. 6A is rearranged into a set of three squares each having a quantum level of 100 and a square having a quantum level of 12. If more than one picture elements having equal quantum numbers are present, these elements are assigned a predetermined order.

Consider the nature of constant C. The fact that the constant C is given the maximum quantum number is to make the area of reconstructed picture elements approach the orignal dot size as possible. However, under certain circumstances it is preferable that the reconstructed area be larger or smaller than the dot size. In the former case, the constant C is chosen at a value smaller than the maximum quantum number and in the latter case the constant C is chosen at a value larger than the maximum quantum number. If C is set equal to 85, the rearranged matrix will have a set of three picture elements having a quantum level of 85 each and a picture element having a quantum level of 57, so that a set of four blacks will be reconstructed. Likewise, if C=135, rearrangement will result in a matrix having two quantum levels 135 and a single quantum level 42 so that two blacks will be reconstructed.

Since the actual number of picture elements in a matrix is far greater than that shown in FIG. 6A, the above described method is impractical. In a practical embodiment, the present invention relies on the concept of matrix scanning. Since the matrix size is determined in consideration of the degree of complexity involved in data processaing and its cost effectiveness, description will be concerned with a 3×3 matrix.

Figure 7:
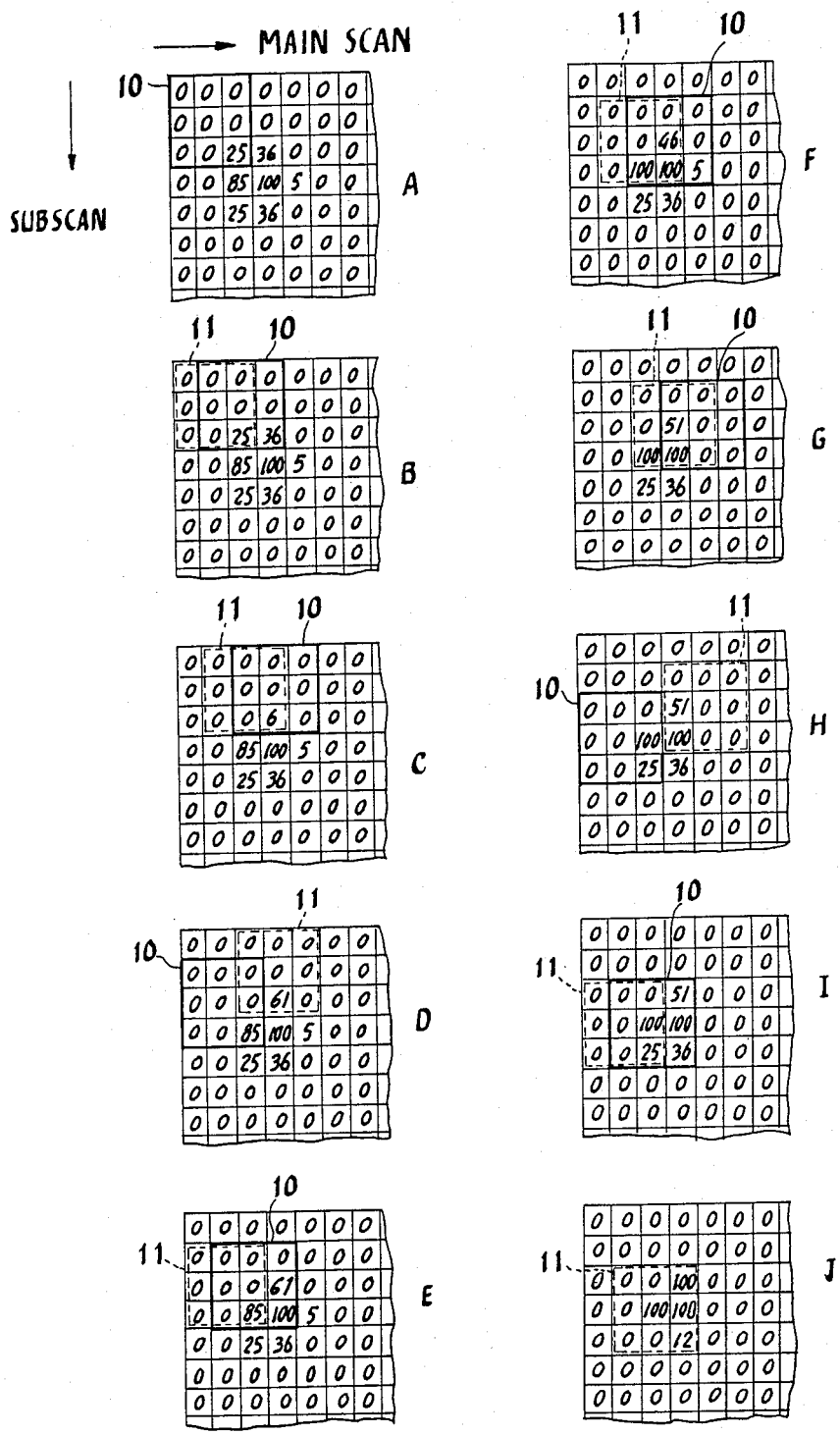
FIGS. 7A to 7J are illustrations useful for describing the operation of an embodiment of the invention and video data redistribution.

FIGS. 7A to 7J are illustrations of views for explanation of matrix scan and rearrangement of quantum numbers. In FIG. 7A is shown a portion of the original in which the same quantum numbers as used in FIG. 1 are used for convenience. Illustrated at 10 in FIG. 7A is the 3×3 matrix which is scanned rightward in the direction of main scan and successively downward in the direction of subscan. As the matrix 10 is shifted in the directions of main and subscans the quantum data are rearranged as shown in FIGS. 7B to 7J. The rearrangement begins with the data within the matrix 10 of FIG. 7A in a manner as described in FIGS. 6A to 6C. As a result of this rearrangement, a new matrix is shown at 11 in FIG. 7B. In this rearrangement, no changes occur in quantum numbers. The matrix 10 is then shifted one column to the right as shown in FIG. 7B and rearranged into a new matrix which is shown at 11 in FIG. 7C. The process is repeated so that the matrix is shifted and rearranged successively until the end of the scanned row is reached. The matrix is then returned to the starting point of the line scan and shifted one row in the direction of subscan as shown in FIG. 7D. The above process will be repeated so that the matrix 10 of FIG. 7D is rearranged into a matrix 11 of FIG. 7E, the matrix 10 of FIG. 7E is rearranged into a matrix 11 of FIG. 7F and so on, until the matrix 10 of FIG. 7I is rearranged into a matrix 11 of FIG. 7J. In this example, no identical quantum levels occur other than 0 and 100. If this occurs, a quantum level of earlier occurrence in the direction of subscan should be given a higher priority and a quantum level of earlier occurrence in the direction of main scan is given the next higher priority. The reason for this is to avoid the recurrence of data conversion. If the same quantum numbers are rearranged on the same row or column the data conversion will be repeated and the quantum number is likely to be reconverted to a larger value.

Figure 8:
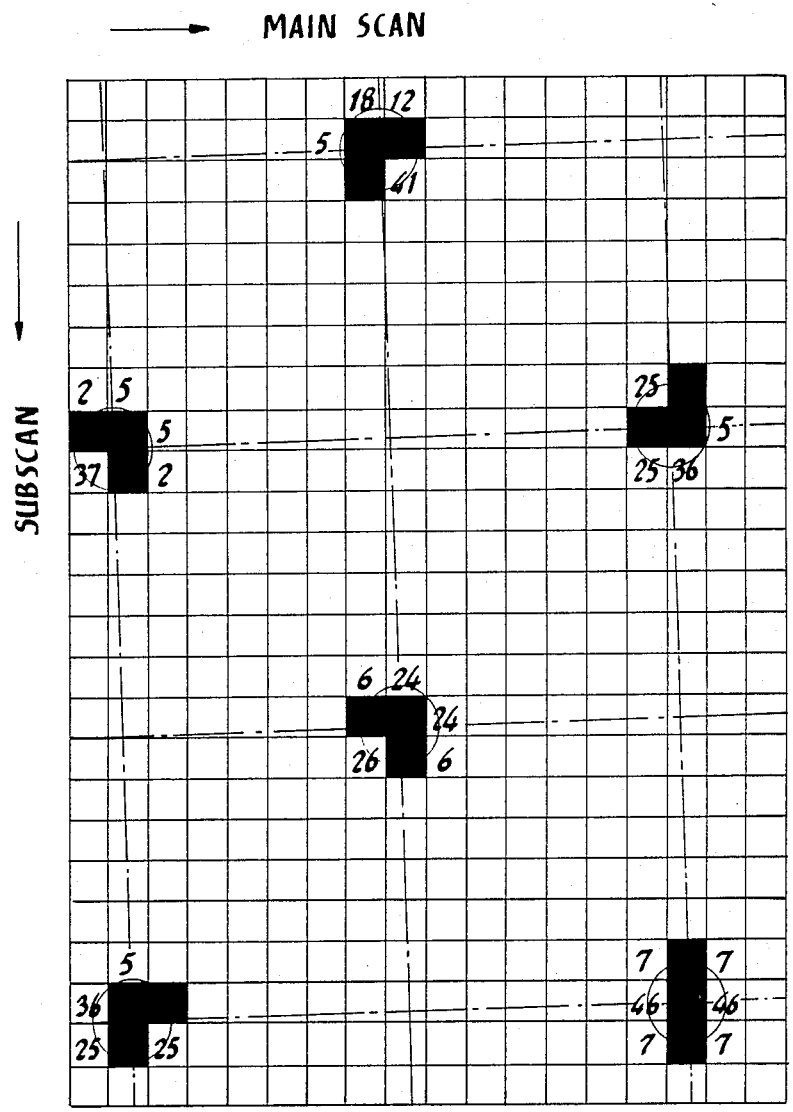
FIG. 8 is an illustration of a two-valued picture of the original of FIG. 1 reconstructed according to the present invention.

FIG. 8 is an illustration of the result of the data conversion performed on the screen dots of FIG. 1 according to the manner just described in which the picture elements are indicated by the original quantum numbers. it is seen that each of the original screen dots are translated into a set of three picture elements which minimizes the aforesaid errors and compares favorably with FIG. 2.

Figure 9:
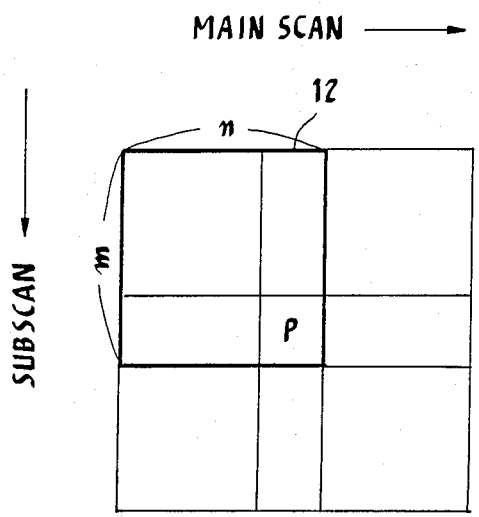
FIG. 9 is an illustration of a maximum area represented by a two-valued data point P.

The description will now be concerned with a manner in which the invention is applied to conversion of a video signal which has been derived from a halftone original. The maximum range of halftone values that can be reconstructed is related to the size of the unit matrix. More specifically, it depends on how a given reconstructed black or white area is rearranged. For example, an m×n matrix of FIG. 9 where the matrix area is denoted as Sp, is given as $$Sp = (2m-1) \times (2n-1)$$

Therefore, for a matrix size of 3×3, Sp becomes 25, a total of 25 picture elements around the point P are involved. Because of the nature of the algorithm employed in the invention, the reconstructed image has a strong dependency on the distribution of data on the original, and the data conversion becomes complicated.

Figure 10:
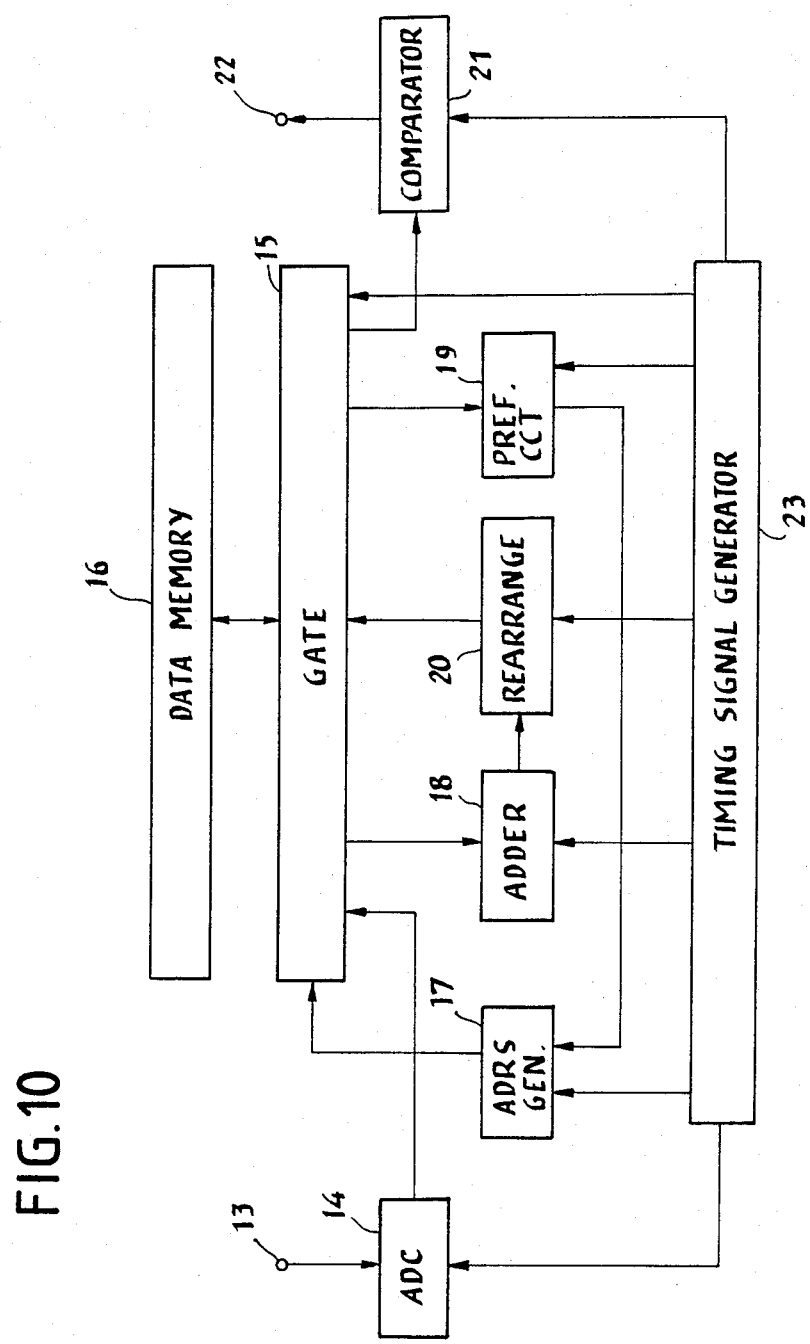
FIG. 10 is a block diagram of an embodiment of the invention.

A video signal processing system of the present invention will now be described. FIG. 10 is a block diagram of a data conversion circuit which implements the operating principle of the invention. An analog video signal, applied to an input terminal 13, is fed to an analog-to-digital converter 14, the digitized video signal being coupled to a gate circuit 15 and thence to a data memory 16. The memory 16 has a capacity of simultaneously storing a plurality of scan line data (if 3×3 matrix scan is employed, a three-line capacity is required). The memory 16 is addressed by an address decoder 17. A data adder 18 receives the data within a matrix from the memory 16 by way of the gate 15 and totalizes the quantum numbers of the received data. A preference circuit 19 accepts the matrix data via the gate 15 and arranges the data in the order of magnitude and generates address codes corresponding to the locations of picture elements within that matrix so that the data having a greater quantum number is assigned an address code having a higher positional priority in the matrix than that assigned to the data having a smaller quantum number. The generated address codes are transferred to the address decoder 17. A data rearrangement circuit 20 is in receipt of the sum data from the adder 18 and synthesizes a set of conversion data. Each of the conversion data is written into the storage location of the memory 16 addressed by the address decoder 17 via the gate 15 so that the original data are rewritten by the new data. The new data are then read out of the memory 16 via gate 15 and passed to a comparator 21 where the signal is compared with a threshold value and converted to a black or white signal and applied to an output terminal 22. A timing signal generator 23 transmits various timing signals to other circuits at proper timing to establish synchronism. Details of the preference circuit 19 and data rearrangement circuit 20 will now be described.

Figure 11:
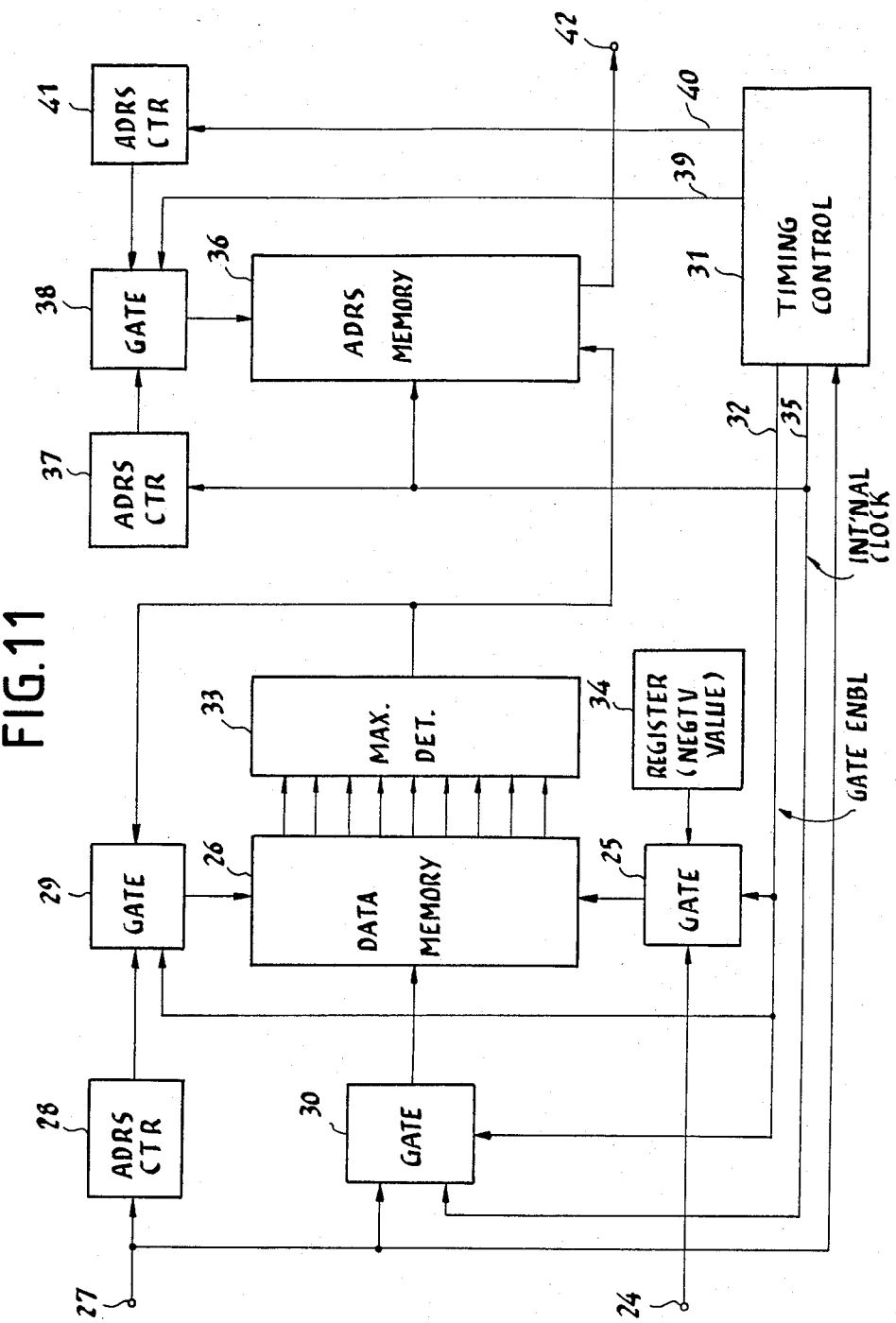
FIG. 11 is a block diagram of the preference circuit of FIG. 10.

FIG. 11 is an illustration of the preference circuit 19. A set of nine data of a given 3×3 matrix is read out of the memory 16 and applied through a terminal 24 to a gate 25 and thence to a data memory 26 having a set of nine shift registers into which the corresponding data are loaded in response to timing signals supplied through a terminal 27 from the timing signal generator 23. More specificallly, the timing signal is received by an address counter 28 whose binary address code is coupled through a gate 29 to the data memory 26 to access to the addressed shift register. The timing signal is also applied through a gate 30 to the data memory 26 as a data write enable clock and at the same time applied to a timing control circuit 31 which in turn provides a gate switching signal on a line 32. The signal on line 32 drives the gates 25, 29 and 30 to allow the set of nine data to be admittted to the data memory 26 when the system is in a data input mode. A maximum value detector 33 detects the datum having the maximum quantum number from among the data now stored in the data register 26 and delivers an address code corresponding to the detected datum. At this moment, the system is in a rewrite mode and the timing control circuit 31 enables the gates 25, 29 and 30 to permit the address code of that maximum datum to be loaded into the memory 26. At the same time a coefficient datum of negative value is applied from a data generator 34 through gate 25 to the data memory 26. An internal clock is applied from the timing control circuit 31 via a line 35 and gate 30 to the data memory 26 to allow the maximum datum to be rewritten to a negative datum as a tag indicating that it has been detected to allow the next higher maximum value to be detected. When a series of nine internal clock pulses has been delivered to the clock line 35, all the data have been rewritten to negative values. In response to the occurrence of each internal clock the maximum value detector 33 delivers an address code in the order of magnitude in quantum number starting with the address code associated with the maximum value datum. Clock pulses on line 35 are applied to an address counter 37 for generating an address code which is coupled through a gate 38 to the address memory 36 when the gate 38 is enabled in response to a low-level signal on line 39 from the timing control circuit 31 to enable the address codes from the data memory 26 to be loaded successively into shift registers of an address memory 36. After loading the nine address codes into the address memory 36, the timing control circuit 31 applies clock pulses on line 40 to an address counter 41 for generating reading address codes. At the same time, a high-level signal on line 39 enables the gate 38 to pass the reading address codes in succession to the address memory 36 for reading the stored address data therefrom and applying it through an output terminal 42 to the address generator 17, FIG. 10.

Figure 12:
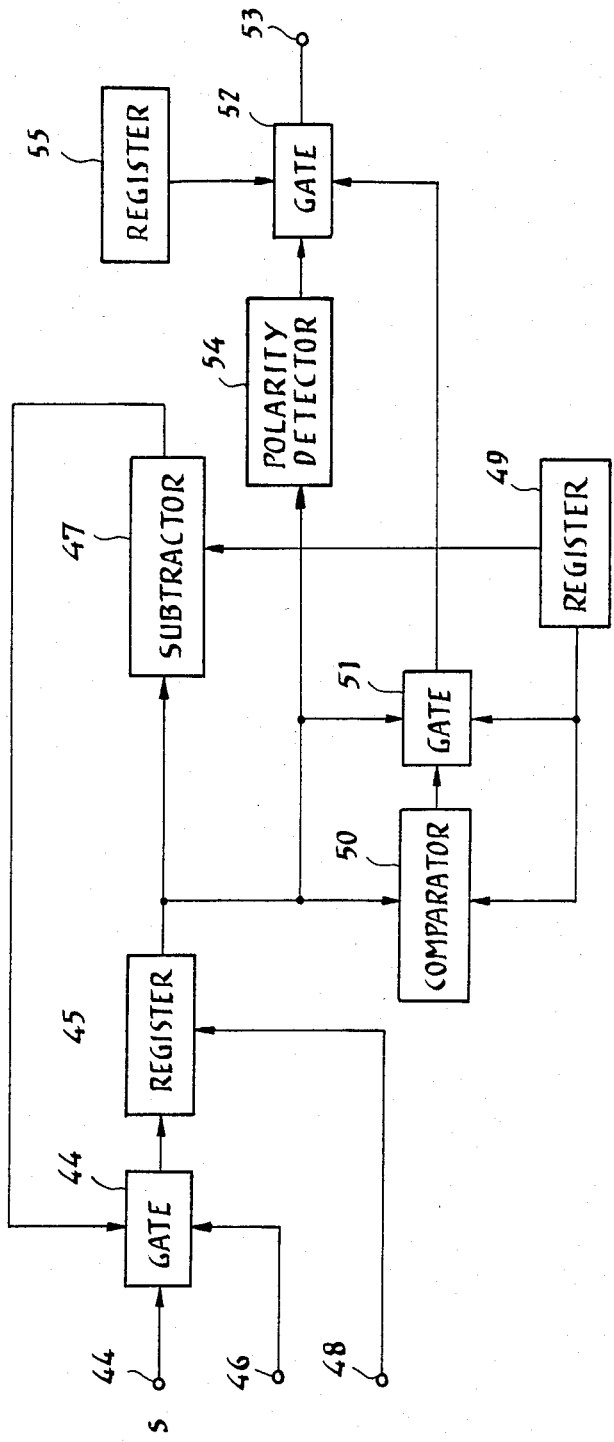
FIG. 12 is a block diagram of the data rearrangement circuit of FIG. 10.

FIG. 12 is an illustration of the data rearrangement circuit 20. The summation data S representing the total of quantum numbers within a given matrix is supplied from the adder 18 through terminal 43 and gate 44 and stored into a register 45 in response to a timing signal supplied from terminal 46 to the gate 44. A subtractor 47 receives a constant C from a register 49 and subtracts it from the contents of the register 45 in response to a timing signal applied to terminal and feeds back its output through the gate 45 to the register 45, so that the output of the subtractor 47 is of a successively decreasing value. A comparator 50 makes comparison between the contents of registers 45 and 49 and enables a gate 51 to pass the contents of register 49 when the contents of register 45 are equal to or greater than those of register 49 or enables it to pass the contents of register 45 when the contents of register 45 are smaller than those of register 49. A polarity detector 54 detects whether the contents of the register 45 are positive or negative and enables a gate 52 to pass the output of gate 51 to an output terminal 53 when a positive value is detected and enables it to pass a constant "zero" from a register 55 to pass to the terminal 53 when a negative value is detected.

Figure 13:
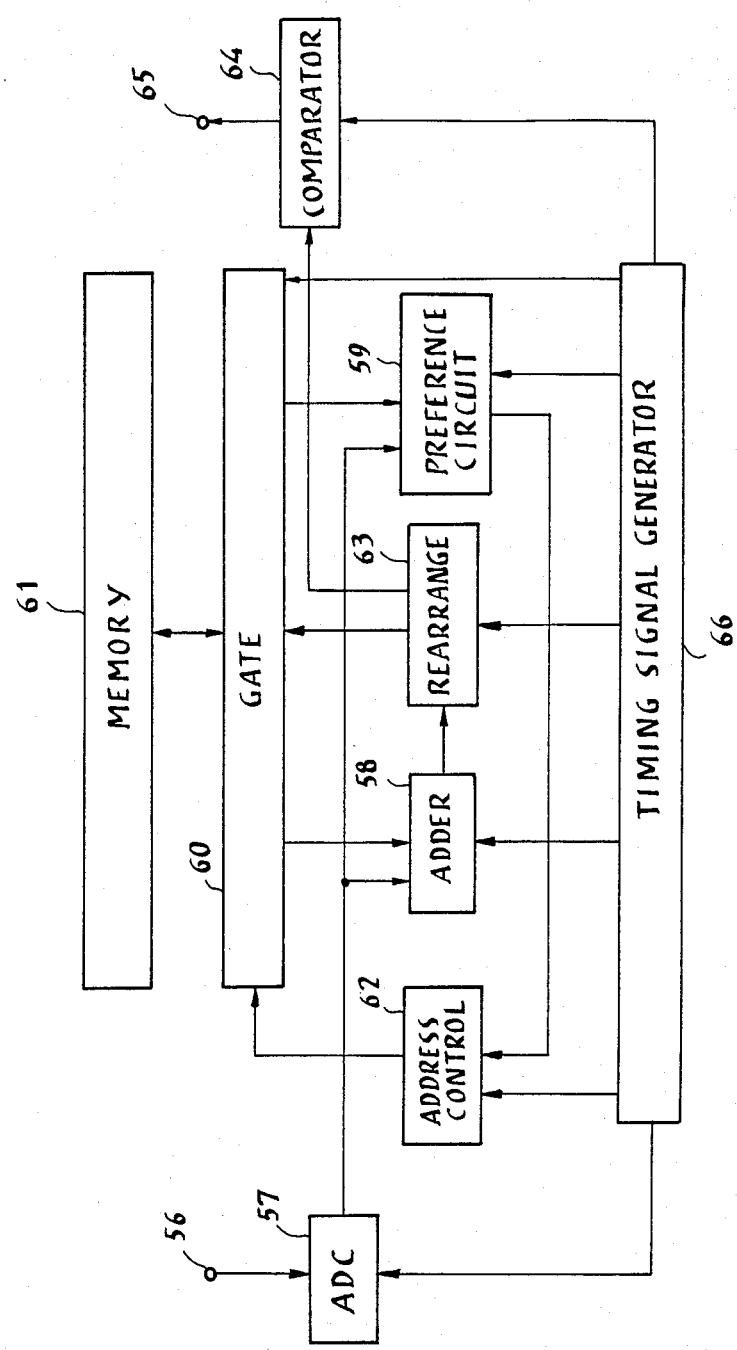
FIG. 13 is a block diagram of another embodiment of the invention.

While the FIG. 10 embodiment processes the data on a per line basis, an embodiment shown in FIG. 13 processes the data on a per picture element basis. An analog-to-digital converter 57 receives an input analog video signal at terminal 56, the digitized signal being applied to a data adder 58 and to a preference circuit 59. The data adder 59 provides summation of new digitized video data from the converter 57 and old matrix data retrieved from a one-line memory 61 through gate 60. The preference circuit 59 is also in receipt of old matrix data from the memory 61 via gate 60 to determine address codes according to the order of magnitude of the received data and transfers the address codes to an address generator 62. A data rearrangement circuit 63 derives conversion data from the output of the adder 58 and writes the conversion in succession into the storage locations of the memory 61 specified by the address generator 62 via gate 60. The data from which conversion address codes have been derived are fed to a comparator 64 and applied to a video recording system through an output terminal 65. A timing signal. A timing signal generator 66 provides timing signals to various circuits of the system for establishing synchronism. The embodiment of FIG. 13 has a smaller memory capacity than the memory capacity of FIG. 10.

The present invention could also be implemented by the use of a computer.

Figure 14:
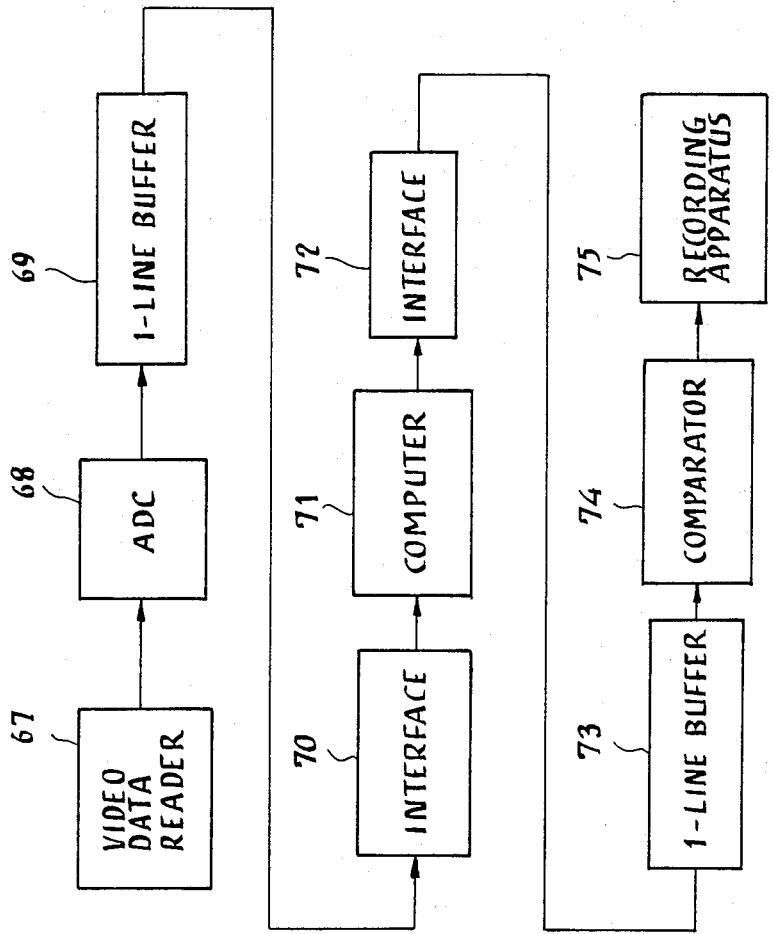
FIG. 14 is a block diagram of a further embodiment of the invention.

In FIG. 14, a video output from a scanner 67 is digitized by an analog-to-digital converter 68 and fed to a one-line buffer memory 69. The video data are transferred through an interface 70 to a memory of the computer 71 which operates on the data on a per three-line basis. The data contained in a given scan line, after having been converted, are transferred through an output interface 72 to a one-line buffer memory 73 and thence to a comparator 74 to generate black and white signals for application to a recorder 75. This comparator can be dispensed with if black and white level conversion is to be effected in the computer.

The operation of the embodiment of FIG. 14 will be described with reference to a flowchart. For the sake of simplicity the description is only concerned with the essential part of the operation. The following a number of conventions used in the invention:
(1) Data comprising a picture element is represented a quantum number smaller than 8 bit;
(2) The computer has 1-byte processing capability; and
(3) The memory of the computer operates on a byte address basis.

Figure 15:
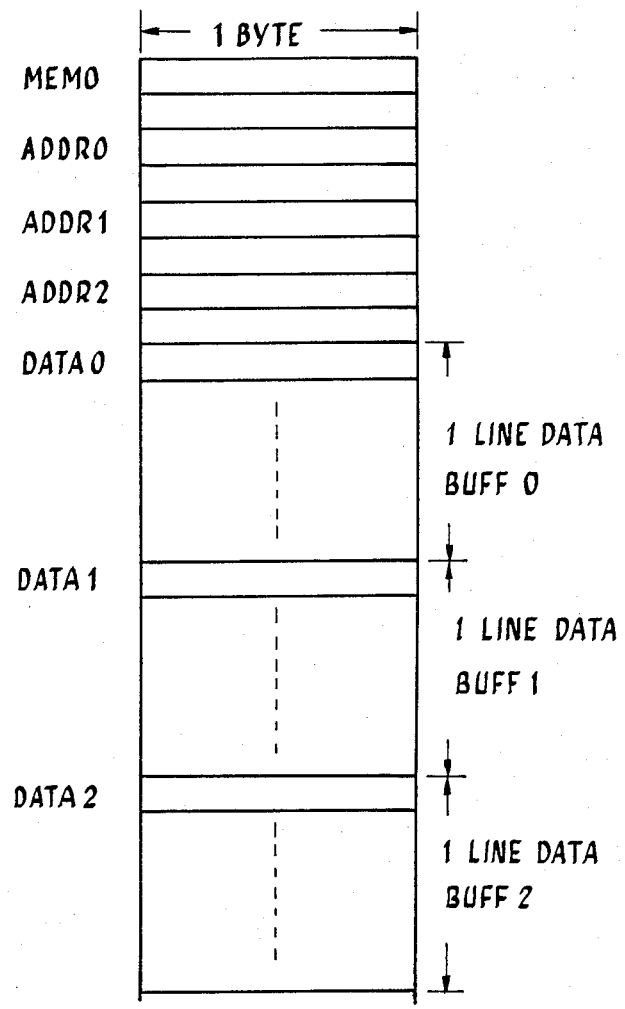
FIG. 15 is an illustration of a data area within the memory of the system of FIG. 14.

FIG. 15 shows a data storage area of the computer memory for storing three-line data in respective locations designated BUFF0, BUFF1 and BUFF2 in which the first byte address locations are designated respectively DATA0, DATA1 and DATA2. Byte addresses ADDR0, ADDR1, ADDR2 and MEMO are used to store the address data DATA0, DATA1 and DATA2 as control parameters.

Figure 16:
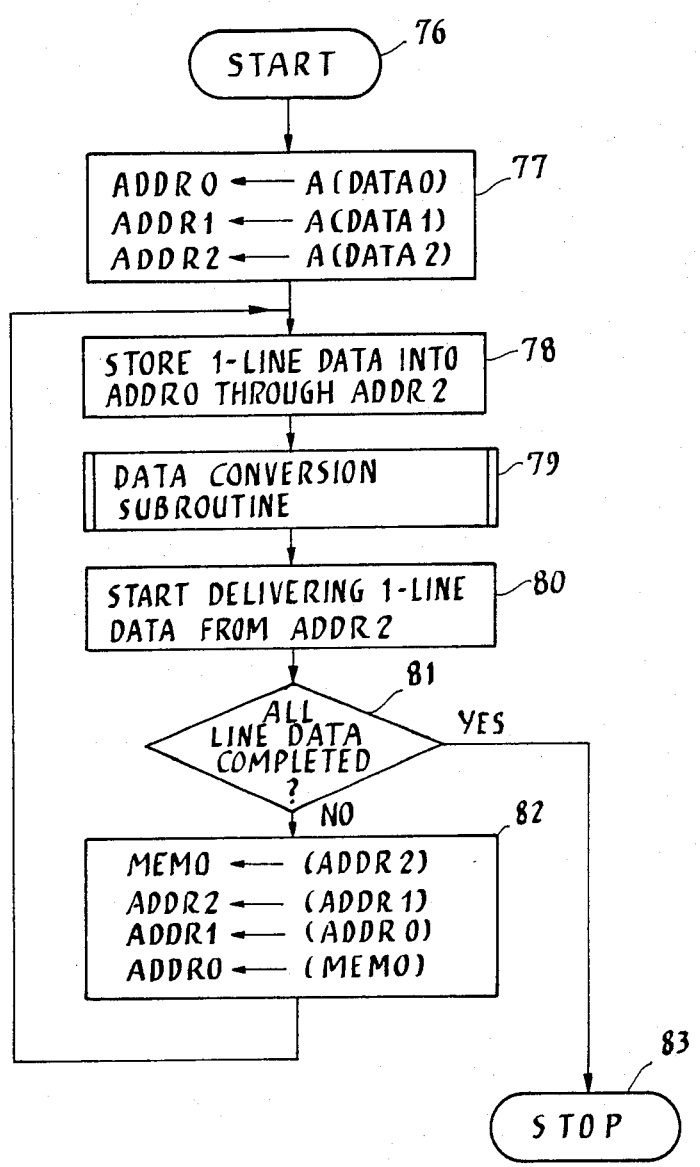
FIG. 16 is a flowchart of the main routine of the computer of FIG. 14.

In FIG. 16, the program which starts at 76 executes a subroutine 77 by initializing the byte addresses ADDR0, ADDR1 and ADDR2 with the addresses of DATA0, DATA1 and DATA2, respectively (where A(DATA0) represents the address of DATA0). The program execution proceeds to a subroutine 78 in which one-line data of ADDR0, ADDR1 and ADDR2 are written into the line-data areas BUFF0, BUFF1 and BUFF2, respectively and then proceeds to a subroutine 79 for performing data conversion which will be described in detail. A subroutine 80 is to successively read out one-line data starting with the area in which the data addressed by ADDR2 are stored. A subroutine 81 checks if data conversion has been completed with respect to all the line data and if so the program execution exits to 83 and if not, exits to a subroutine 82 to update the control parameters. In this subroutine 82, the contents of ADDR2, ADDR1, ADDR0 and MEMO are transferred to MEMO, ADDR2, ADDR1 and ADDR0, respectively.

Figure 17:
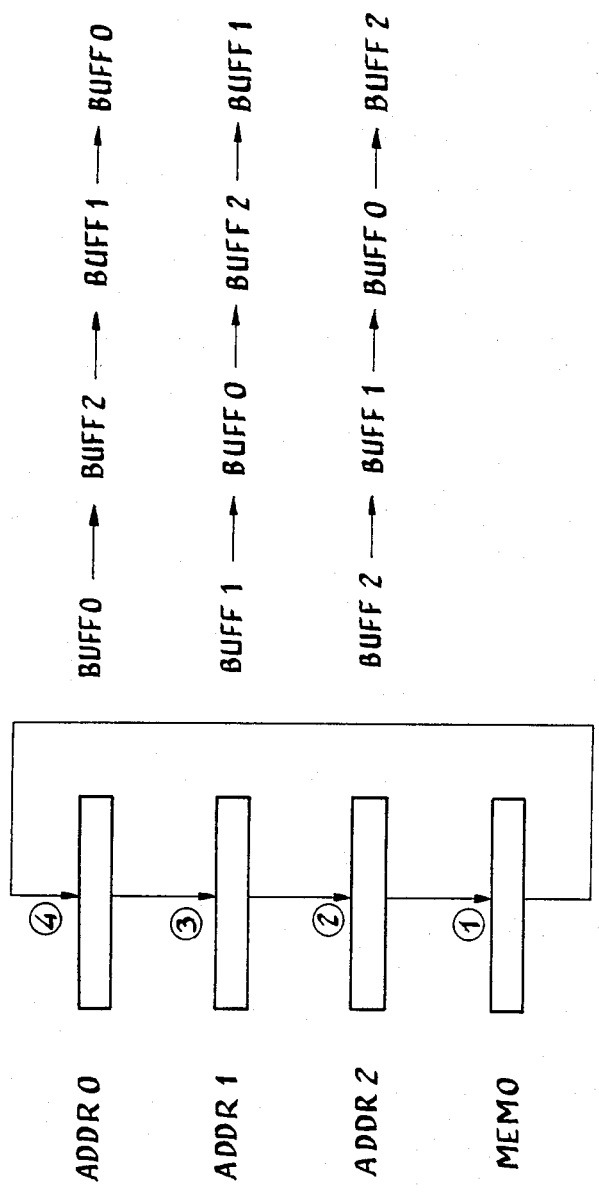
FIG. 17 is an illustration describing the flow of input and output data in the flowchart of FIG. 16.

FIG. 17 is an illustration of the input and output data transfer operations of FIG. 16. Illustrated at circled numerals 1 to 4 are the order of appearance of data in the subroutine 82. As the program execution completes an operation through the loop, the data area specified by the address ADDR0 changes from BUFF0, BUFF2, BUFF1 to BUFF0, the data area specified by the address ADDR1 changes from BUFF1, BUFF0, BUFF2 to BUFF1, and the data area specified by the address ADDR2 changes from BUFF2, BUFF1, BUFF0 to BUFF2. It is seen from FIG. 17 that when the ADDR0 data are loaded into the BUFF0 location the ADDR2 data are unloaded from the BUFF2 location, and when the ADDR0 data are loaded into the BUFF2 location the ADDR2 data are unloaded from the BUFF1 location, and when the ADDR0 data are loaded into the BUFF1 location the ADDR2 data are unloaded from the BUFF0 location.

Figure 18:
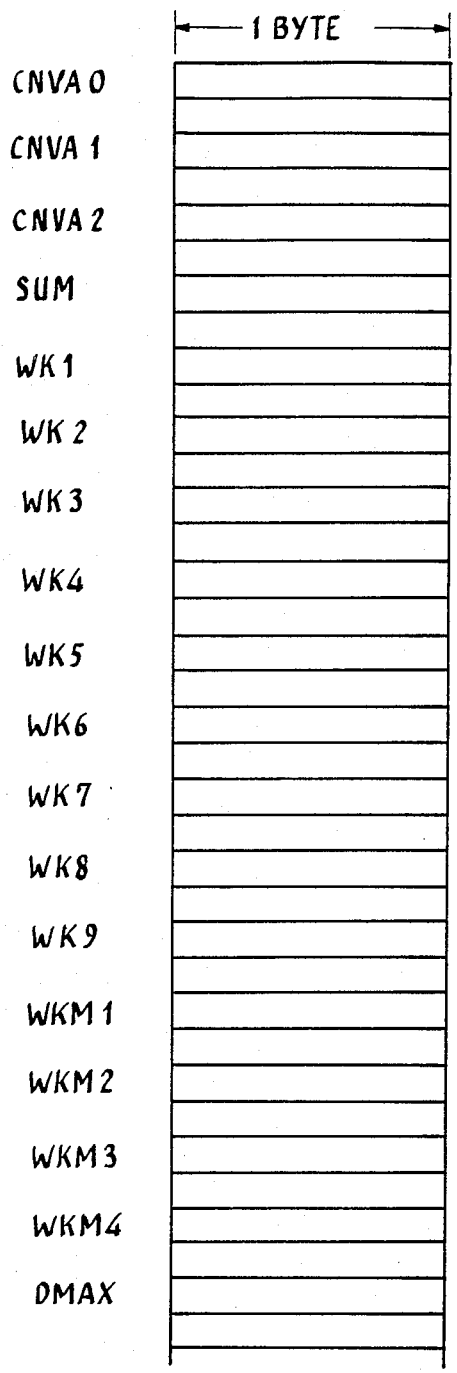
FIG. 18 is an illustration of various parameters used for data conversion.

FIG. 18 is an illustration of the parameters used in data conversion. CNVA0 to CNVA2 designate the first addresss of data conversion matrices. SUM designates the total of the quantum numbers of the data within a matrix. WK1 to WK9 represent addresses of the data arranged in the order of magnitude in quantum number within a given matrix. WKM1 to WKM4 indicates storage areas reserved for use in storing address and control data. DMAX indicates a location in which the constant corresponding to the maximum quantum number is to be stored. If the data is represented by hexadecinormal notation, the constant is assigned with the maximum "F".

Figure 19:
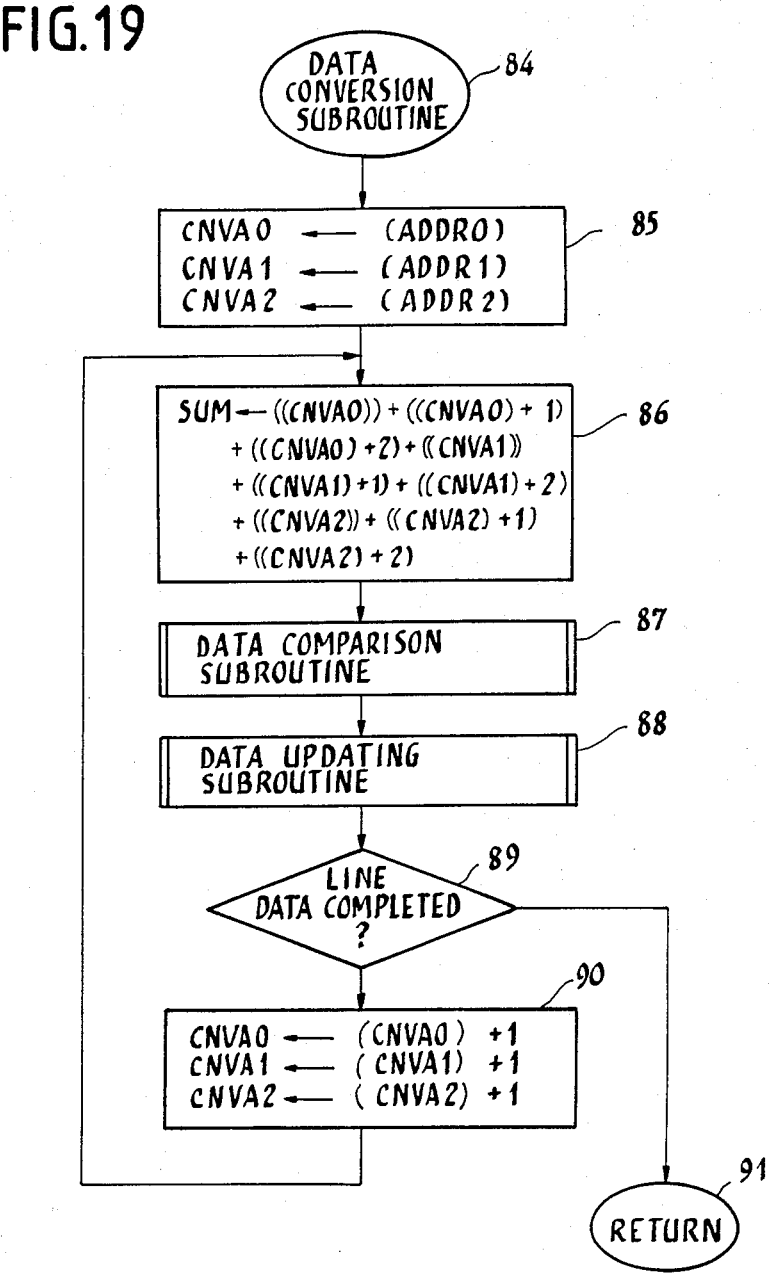
FIG. 19 is a flowchart describing a data conversion subroutine.

FIG. 19 illustrates a flowchart of the data conversion subroutine. The program starts at 85 by initializing the first addresses of data conversion matrices by setting the ADDR0, ADDR1 and ADDR2 data into the CNVA0, CNVA1 and CNVA2 locations, respectively. At Step 86, a total value of the data within the matrices is derived and set into the location SUM. The data to be summed are as follows:
1. Address of CNVA0
2. Address of CNVA0+1
3. Address of CNVA0+2
4. Address of CNVA1
5. Address of CNVA1+1
6. Address of CNVA1+2
7. Address of CNVA2
8. Address of CNVA2+1
9. Address of CNVA2+2.

Block 87 indicates a data comparison subroutine in which the above-listed data are compared against each other and stored into the locations WK1 to WK9 in the order of magnitude in a manner as will be described later. The program execution goes to a subroutine 88 in which it performs updating the old data in the order starting with WK1 through WK9 with new data according to the contents of SUM in a manner as will be described. In a subroutine 89 the computer checks if the data processing has been completed in the direction of line scan to terminate the data conversion routine at 91 and if not, the program exits to a subroutine 90 increment the CNVA0 to CNVA2 data by one. The program execution returns to the subroutine 86 to repeat the subroutines 86, 87, 88, 89 and 90.

FIG. 20 shows the data addresses in thier matrix positions. In an address 92, the address of each data is a relative address to the address represented by the contents of ADDR0 to ADDR2, and therefore it is shown in the form of +n. Assume that a scan 3×3 matrix is positioned as indicated, each of CNVA0 to CNVA2 giving the header addresses of the matrix indicates a value equal to each address content of ADDR0 to ADDR2 plus 4. The control to be effected on the data of the 3×3 matrix is effected on the contents of CNVA0 to CNVA2. This can be achieved by use of the data shown at 93.

Figure 21:
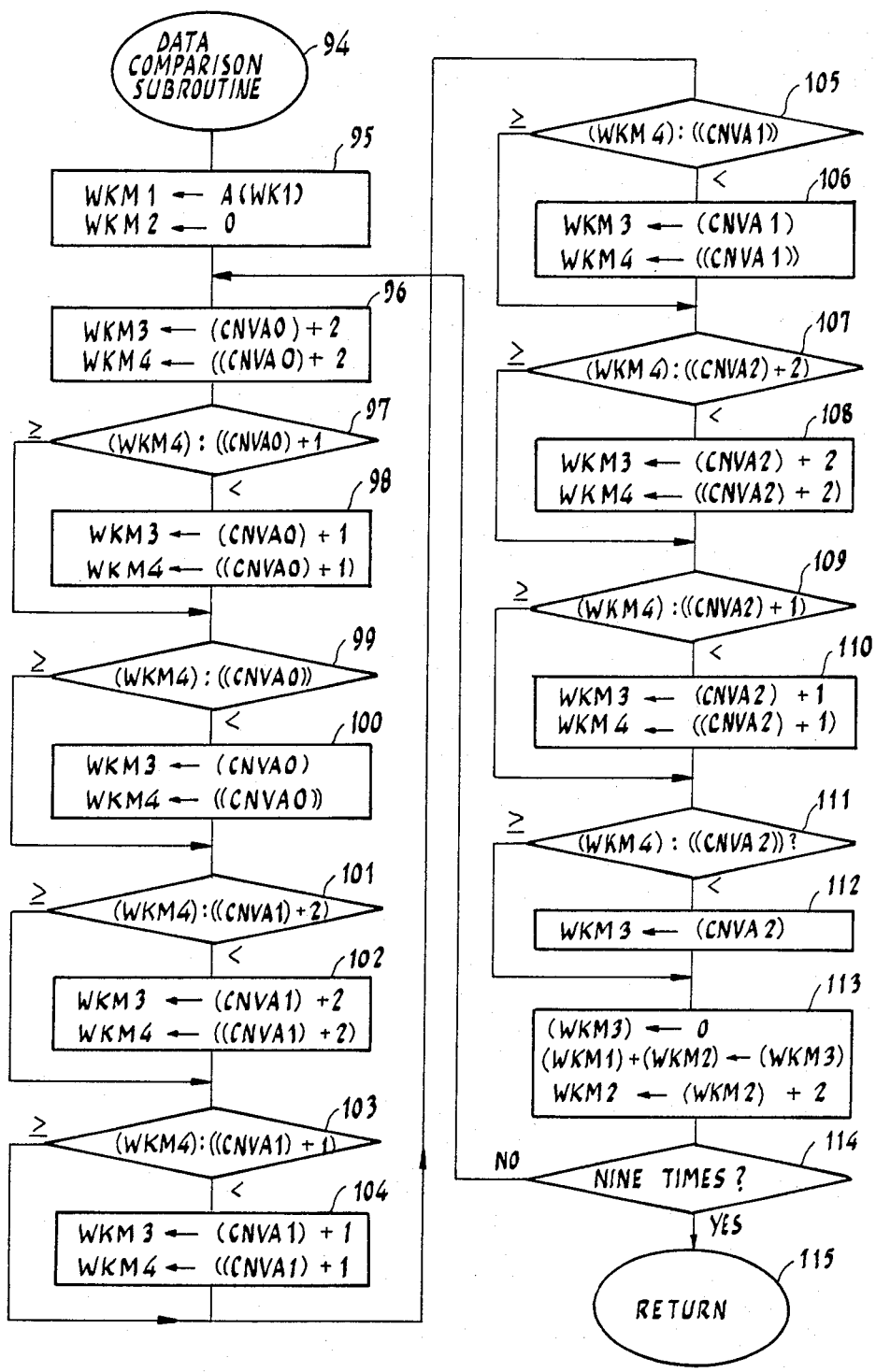
FIG. 21 is a flowchart describing a data comparison subroutine.
Figures 22, 23:
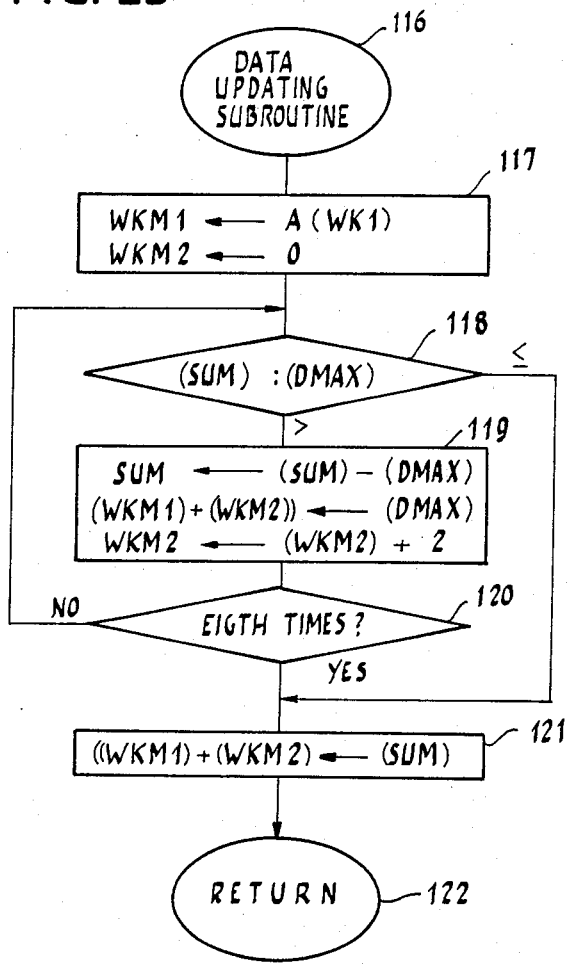
FIG. 22 is a sketch illustrating identified matrix elements.
FIG. 23 is a flowchart describing a data updating subroutine.

FIG. 21 shows a flowchart describing the detail of the data comparison routine. As mentioned above, address codes are set into WK1 to WK9 in the order of magnitude of the data within the matrix. For convenience, each element of the 3×3 matrix is given an identification as shown at FIG. 22. The parameters are initialized at 95 by setting the address of WK1 into EKM1 and resetting WKM2 to zero. At subroutine 96, the address code and the data of the element E1 set into WKM3 and WKM4, respectively. In a subroutine 97, the contents of WKM4 are compared with the data of the element E2, and if the former is smaller than the latter, the program execution exits to a subroutine 98, and otherwise it advances to a subroutine 99. In the subroutine 98, the address code and the data of the element E2 are set into WKM3 and WKM4, respectively. In the subroutine 99, comparison is made between the contents of WK4 and the data of the element E3. In this way, similar process is executed in respect of each of the elements E1 to E9 of the matrix until a subroutine 112 is reached so that WKM3 is loaded with the address of the element having the maximum value of the matrix. In a subroutine 113, WKM3 is reset to zero, the address code of WKM3 is transferred to a location having an address equal to the contents of WKM1 plus those of WKM2, and the address of WKM2 is incremented by 2. The computer checkes at subroutine 114 to see if the above process have been performed with respect to all the elements of the 3×3 matrix, and if not it jumps to the subroutine 96 to repeat the subroutines 96 to 114 and if so, the data comparison routine is terminated at 115. When the program loop has been executed once, the address code of the maximum one of the elements E1 to E9 is set to WK1 and the data of that maximum element are reset to zero. Upon completion of the second loop execution, the address code of the next maximum data is set into WK2. This continues until WK9 is set, so that upon completion of the ninth time loop execution, all the data of the elements E1 to E9 are reset to zero.

FIG. 23 is an illustration of the data rewriting routine which begins with an initializing subroutine 117 by setting the address of WK1 into WKM1 and resetting WKM2 to zero. In a subroutine a comparison is made between the sum (SUM) of matrix data and the contents of DMAX, and if the sum is greater than DMAX the program execution goes to a subroutine 119 in which DMAX is subtracted from SUM, DMAX is set into a location addressed by WKM1+WKM2, and WKM2 is incremented by two. A subroutine 120 checks if the subroutine 119 has been excuted eight times, and if not the execution returns to the subroutine 118, and if so, it exits to a subroutine 121. If the result of comparison at subroutine 118 shows that SUM is equal to or smaller than DMAX, the subroutine 121 follows. In the subroutine 121, the contents of SUM are set to a location addressed by WKM1+WKM2.

FIGS. 24A to 24C are illustrations of the processes of a uniform halftone original. FIG. 24A shows a set of video data represented by hexadecimal notation (in which full black is denoted by F and full white by 0). A 3×3 matrix is a scan window which is moved in the main scan direction and shifted by a picture element in the subscan direction. In this example, the picture elements in the first two rows and the first two columns are set equal to zero. Since the zero values produce no changes in the data conversion, these zero data areas are excluded from FIGS. 24B and 24C. The result of data conversion is shown in FIG. 24B which is represented further in the form of black and white areas in FIG. 24C in which the black represents data having a value of 8 or more and the white represents data having a value of 7 or less. While the halftone value shown in FIG. 24A is uniform, boundaries between areas of different halftone values will be sharply defined after the data conversion due to the fact that the data tend to accumulate on the side of the higher halftone value when they are rearranged in the order of magnitude.

Figure 25:
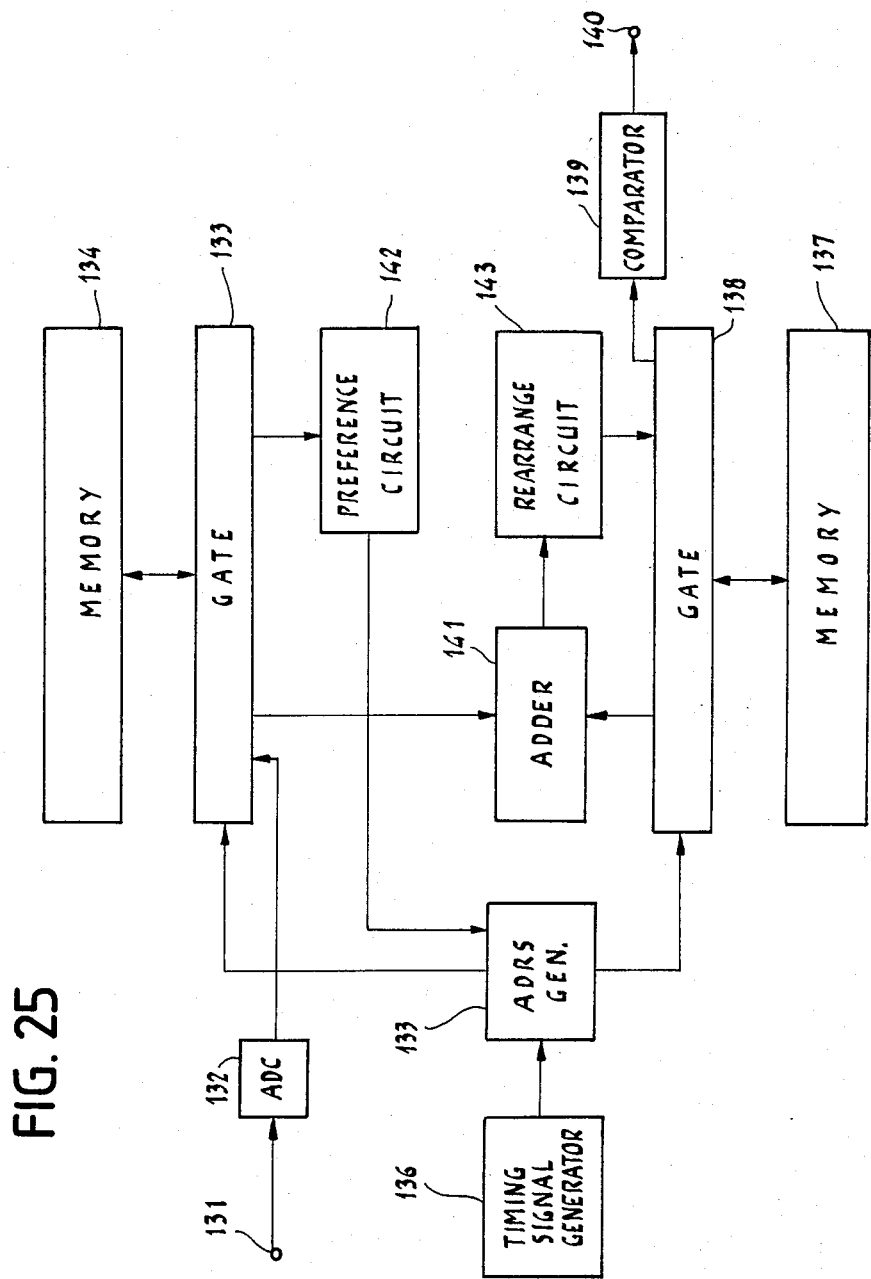
FIG. 25 is a block diagram of a still further embodiment of the invention.

Another embodiment of the data conversion circuit of is illustrated in FIG. 25. The analog video signal at terminal 131 is digitized by an analog-digital converter 132, and passed through a gate 133 to a memory 134. The memory 134 is required to have a capacity commensurate with the number of rows in a scan matrix. Thus, for 3×3 matrix scan, the memory 134 has a 3-line capacity. The memory 134 is addressed by an address generator 135 which is controlled by a timing signal generator 136. A second memory 137 having the same memory capacity as memory 134 is provided to store the rearranged version of the data stored in memory 134 for delivery through a gate 138 to a comparator 139 and thence to an output terminal 140 for video recording. Gate circuits 133 and 138 are under the control of the timing signal generator 136 and the address generator 135 for writing and reading the memories 134 and 137. A data adder 141 provides summation of the rearranged data supplied from memory 137 and a set of new data from the memory 134. A peference circuit 142 receives matrix data from the memory 134 through gate 133 and generates address codes of the memory 137 in the order of magnitude and furnishes the address codes to the address generator 135. A data rearrangement circuit 143 derives data in a rearranged pattern from the sum output of the adder 141 and loads the rearranged data successively into the storage locations of memory 137 addressed by the control circuit 135 through gate 138.

Figure 26A:
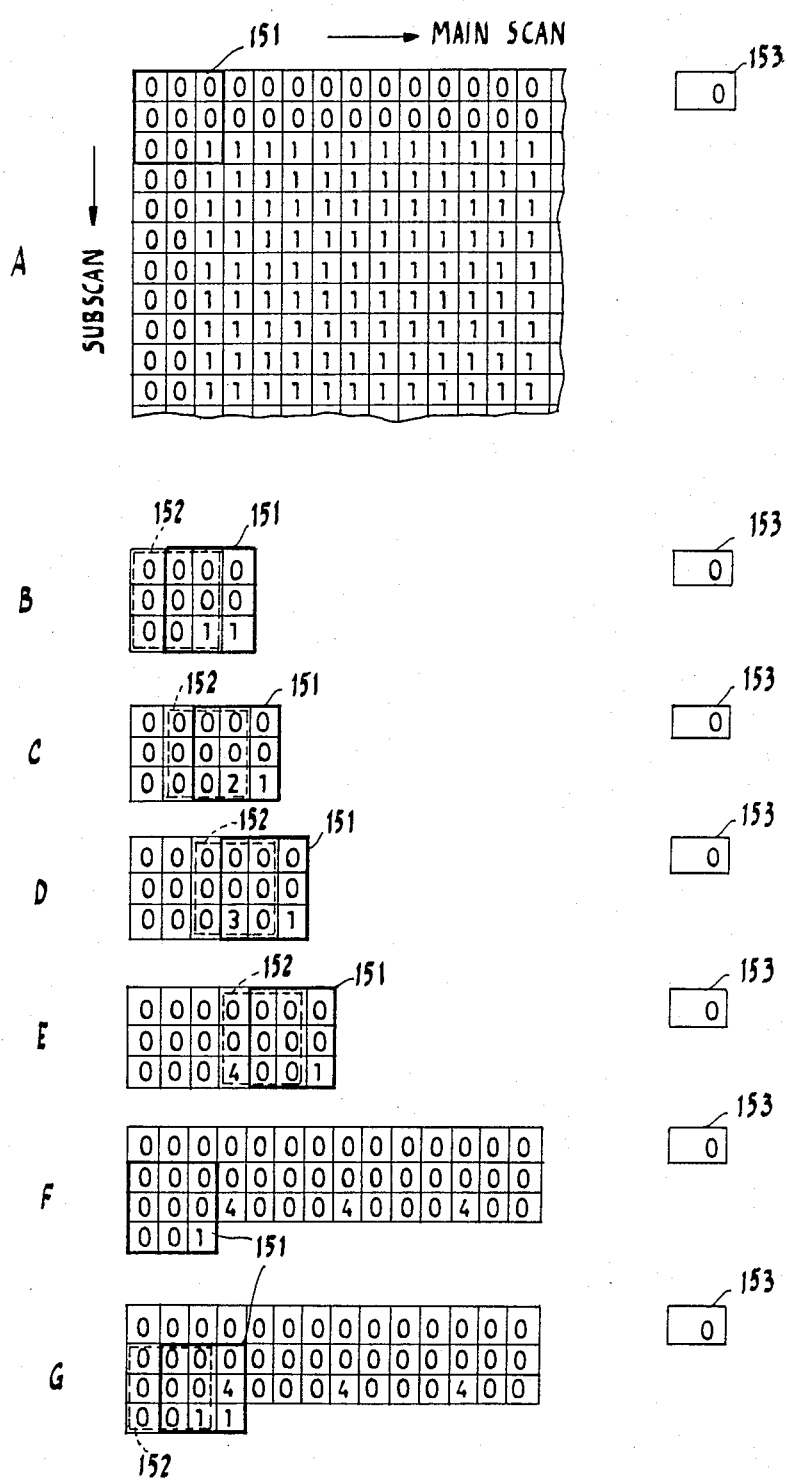
FIGS. 26A to 26Z are illustrations of the process of data conversion according to a further embodiment of the invention.

FIGS. 26A to 26Z show the processes of data conversion on a halftone image according to another embodiment which will be described. FIG. 26A shows a set of video data represented by hexadecimal notation as in FIG. 24A. Illustrated at 151 is a scan window (indicated by a solid line) and the data in that window are summed and rearranged in the next window 152 shown in broken line. Illustrated at 153 is an error correction value E which is reset to zero prior to the beginning of the main scan. The Steps 2 to 6 which have been previously described will be explained with C=F, V=7 in hexadecimal notation.

Figure 26B:
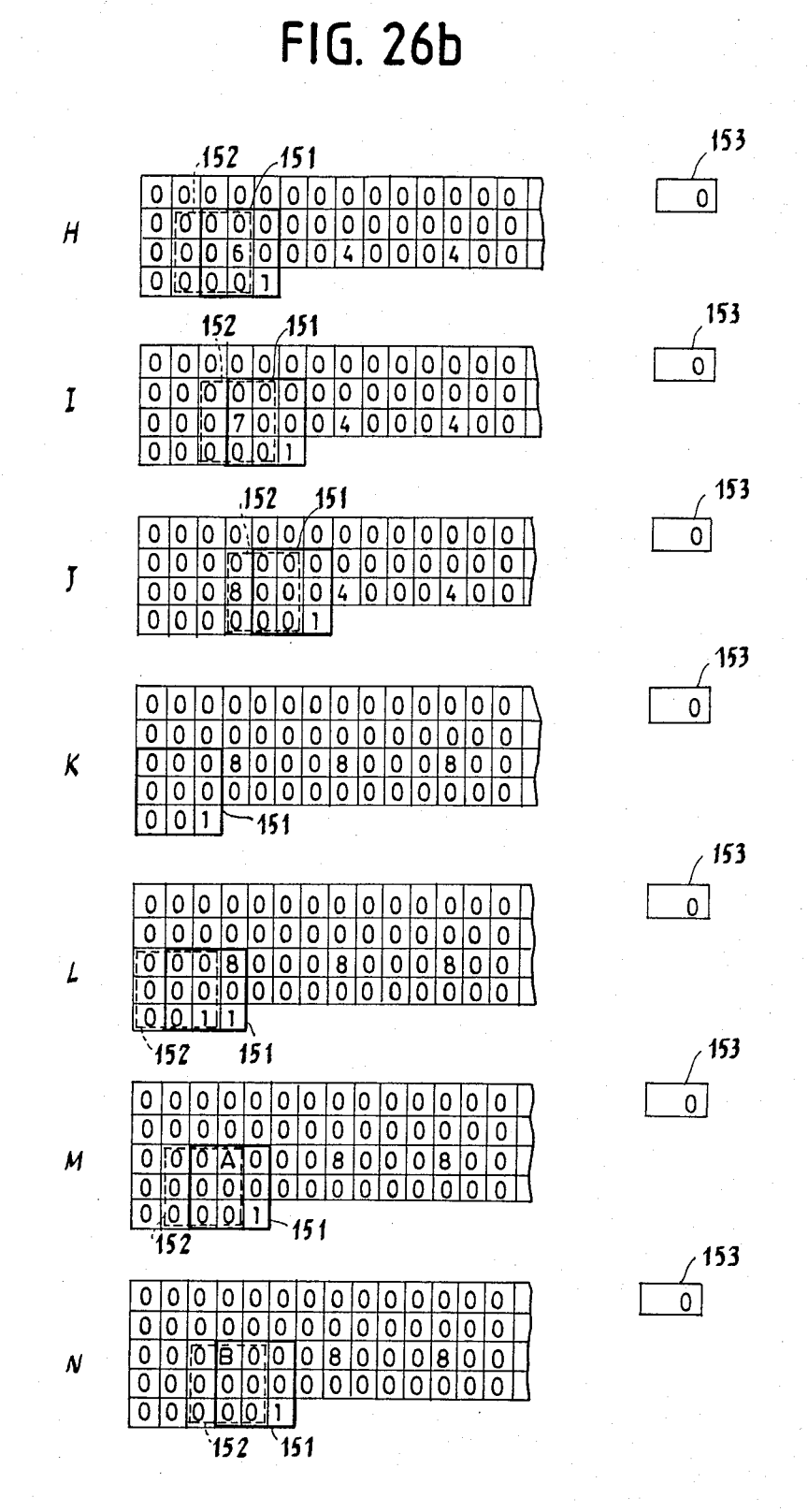
Figure 26C:
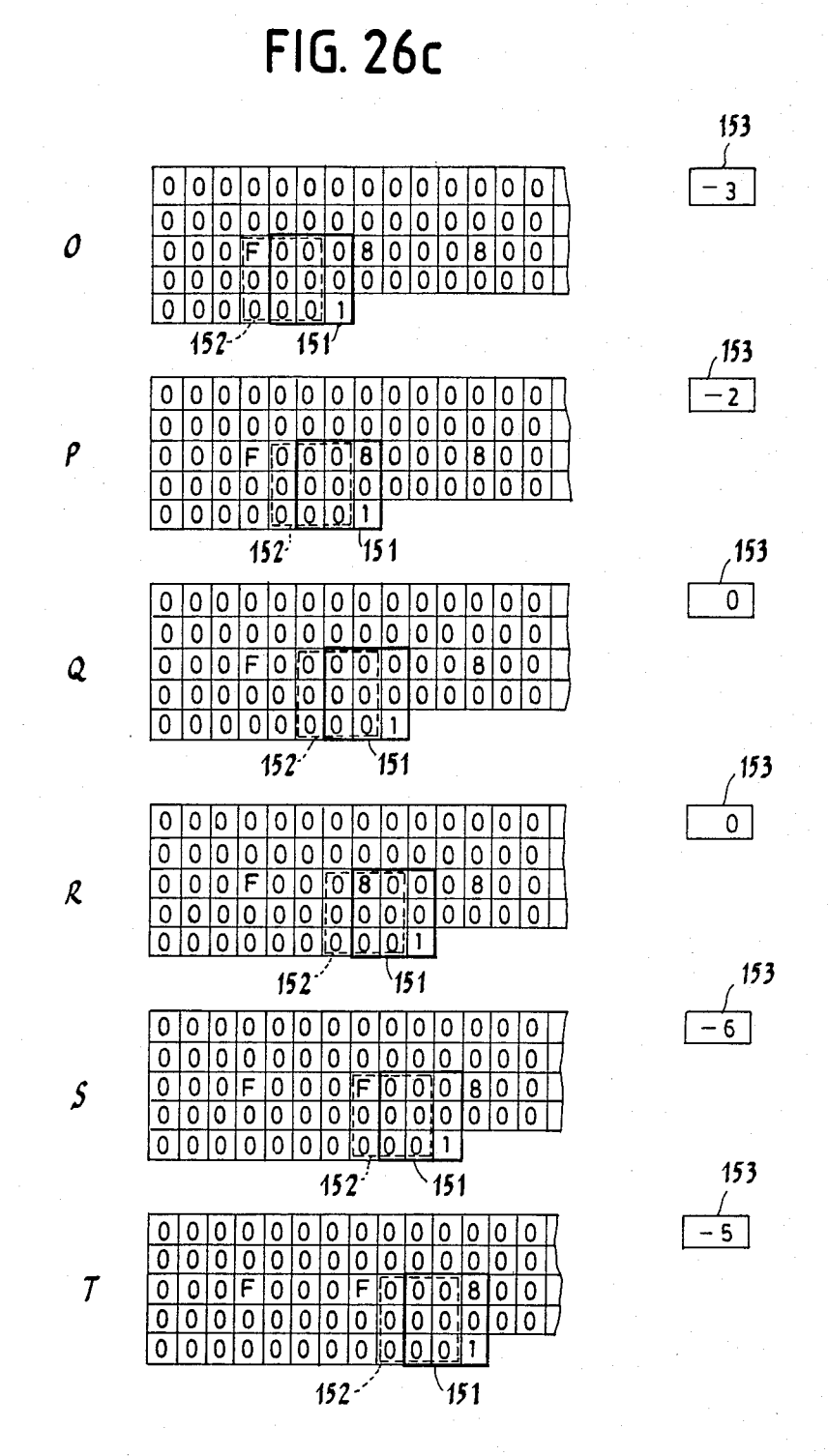
Figure 26D:
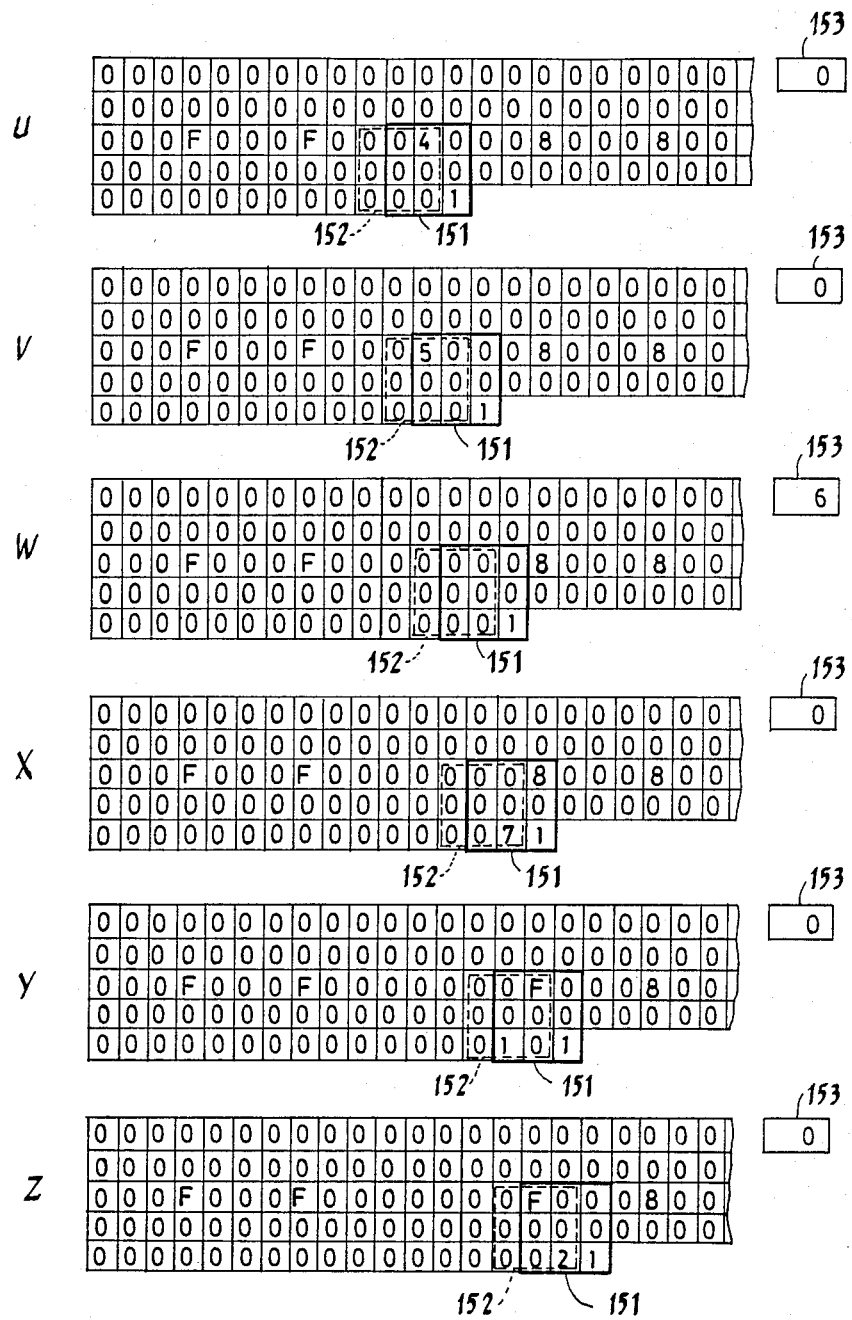

The data in scan window 151 are summed with the error data (which is set to zero) at 153 in FIG. 26A, resulting in rearranged data shown in the scan window 152 of FIG. 26B. The data in the scan window 152, FIG. 26B, are summed with the error data 153 of FIG. 26B, which is also set to zero, and rearranged as shown in the scan window 152 of FIG. 26C. Likewise, the data are summed and rearranged as the scan window is moved as shown in FIGS. 26D and 26E until it reaches the end of the main scan whereupon it moves in the subscan direction as shown in FIG. 26F. Main scan continues as shown in FIGS. 26G and 26J, and then the window is shifted in the subscan direction to continue the main scan as shown in FIGS. 26K, 26L, 26M and 26N. The error correction value E remains zero until the scan window reaches the position of Fi. 26N. In FIG. 26N, the sum of data in windows 151 and the error data equal C. The C value is converted twice according to the Step 4 described previously. More specifically, the value B in the scan window 151 of FIG. 26N is changed to C as $P_{1st}$ and further changed to F as $P_{2nd}$ as shown at 152 in FIG. 26O. At this moment, the error correction value E becomes equal to −3. Summation of the scan window 151 of FIG. 26O with the error data 153 results in −2 and rearrangement of the summed data results in an all-zero pattern shown at 152 in FIG. 26P. The error correction value is now set to −2 according to the Step 4. The above process is repeated as shown in FIGS. 26Q to 26Z.

Figure 27:
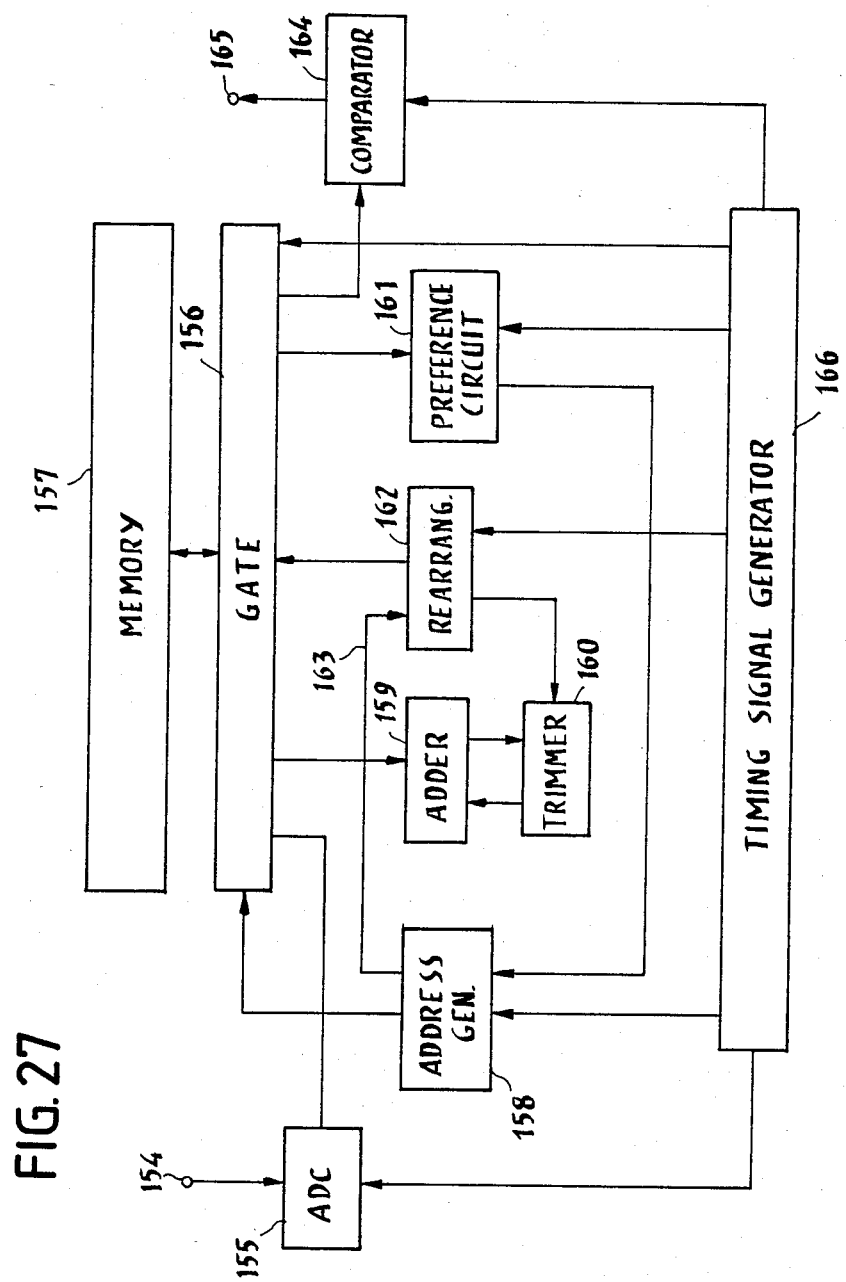
FIG. 27 is a block diagram of an embodiment which implements the processes shown in FIGS. 26A to 26Z.

FIG. 27 is an illustration of the embodiment which implements the process shown in FIGS. 26A to 26Z. The analog video signal at terminal 154 is digitized by an analog-to-digital converter 155 and applied through gate 156 to a 3-line memory 157 which is addressed by an address generator 158. A data adder 159 receives input data through gate 156 from the memory 157 and from a trimming value generator 160 to provide summation of the received input data. A preference circuit 161 retrieves 3×3 matrix data from the memory 157 through gate 156 and determines the order of magnitude and generates corresponding addresses in relative value and applies the latter to the address generator 158 to convert the relative values into address codes of absolute value for addressing the memory 157. A data rearrangement circuit 162 derives rearranged data from the summation signal from the adder 159 and successively stores the rearranged data in the storage locations of the memory 157 addressed by the address generator 158. Simultaneously, an error correction datum of the picture element at Pi,j stated in the Step 4 is derived in the data rearrangement and error detection circuit 162 and notifies it to the trimming value generator 160 in response to a timing signal on a line 163 from the address generator 158. The trimming value generator 160 also receives the summation signal from the adder 159 and derives an error correction value from the summation value and feeds the error correction value to the adder 159. This error correction value will be used when the data in the next scan window are summed. The rearranged stored data are read out of the memory 157 and applied to the comparator 164 to generate a black-and-white signal at terminal 165 for application to the recording system. A timing signal generator 166 provides timing signals to various parts of the system for establish synchronization.

Figure 28:
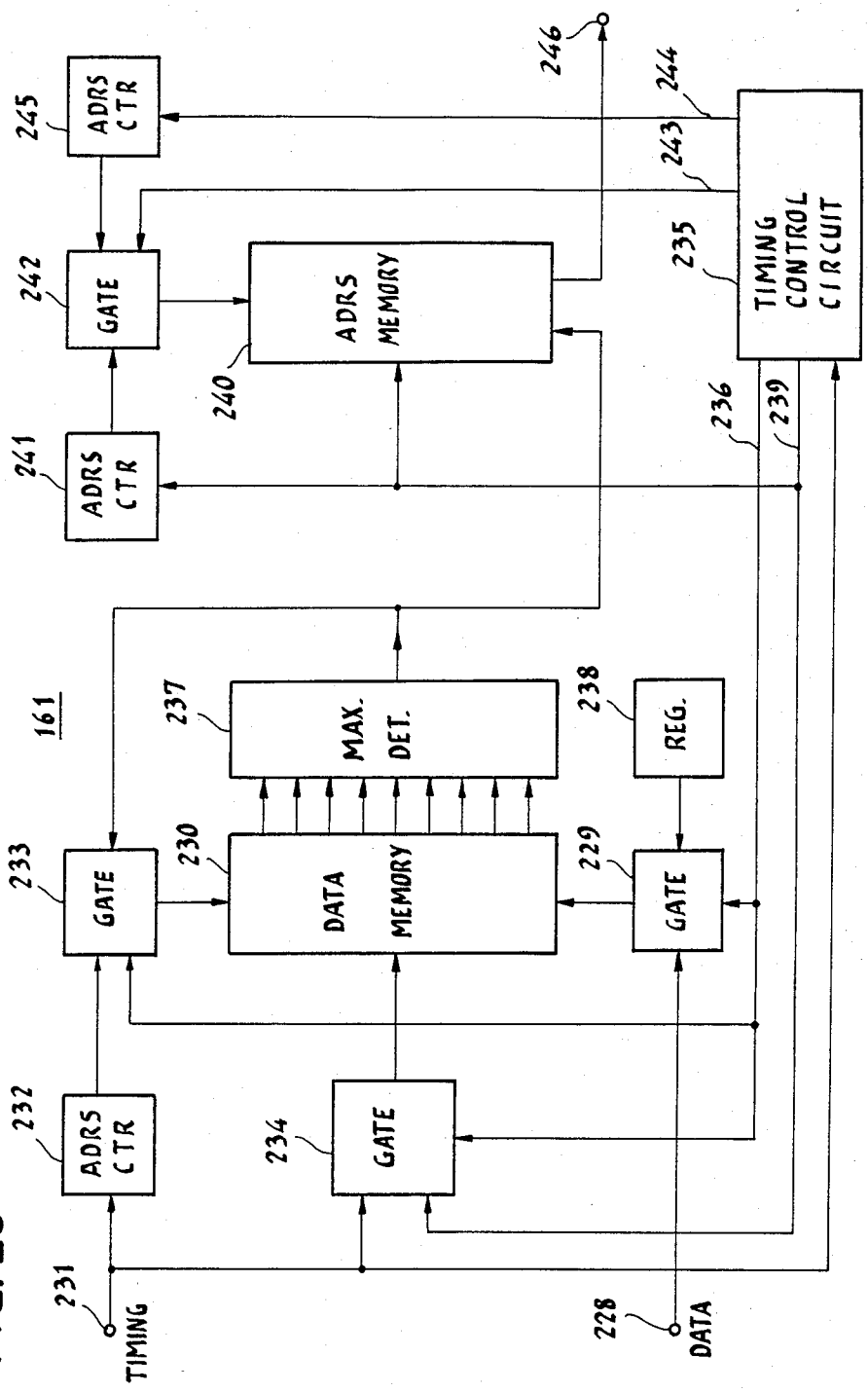
FIG. 28 is a block diagram of the preference circuit of FIG. 27.

Details of the preference circuit 161 are shown in FIG. 28. A set of nine data within a given 3×3 matrix is applied through a terminal 228 and a gate 229 to a data memory 230 including nine shift registers which are addressed in response to address codes provided by way of a gate 233 from an address counter 232 which counts timing pulses supplied to a terminal 231. This timing signal is also applied to a timing control circuit 235 to cause it to apply an enabling signal on line 236 to gates 229, 233 and 234. This allows the signal at terminal 231 to be applied through gate 234 to the data memory 230 as a write clock and the input data on terminal 228 are written successively into the respective registers of memory 230. A maximum value detector 237 detects the maximum value of the set of nine data and provides the address of the detected maximum value datum within the scanned matrix. At this moment, the timing control circuit 235 is providing a gate enabling signal on line 236 to gates 229, 233 and 234 for reading the data from the data memory 230. Under this condition, the address of the maximum datum is fed back through the gate 233 to the data memory 230 and a negative coefficient datum is supplied from a register 238 through gate 229 to the data memory 230, and an internal clock pulse on line 239 is supplied from the timing control circuit 235 through gate 234 to the data memory 230 as a write clock for rewriting the maximum datum with the negative coefficient datum to tag it as an indication that this datum has been detected as a maximum to allow the maximum detector 237 to detect the next higher maximum value, so that all the nine data will be rewritten into negative data when nine internal clock pulses have been supplied to the gate 234. Thus, in response to the occurrence of each internal clock pulse an address code within the 3×3 matrix is generated. The generated address code is read out of memory 230 into an address memory 240 having nine shift registers. This is achieved by applying the internal clock pulse on line 239 to an address counter 241 and also to the address memory 240 as a write enable clock. The output of the address counter 241 is supplied to the address memory 240 via a gate 242 which is enabled in response to a signal on line 243 to specify a shift register of the memory 240 in which the address code from the maximum detector 237 is to be stored. When all the address codes of the matrix are written into the adderss memory 240, the signal on line 243 now switches the gate 242 to apply an output from an address counter 245 which counts clock pulses on line 244 to read out the stored address codes in succession from memory 240 to an output terminal 246.

Figure 29:
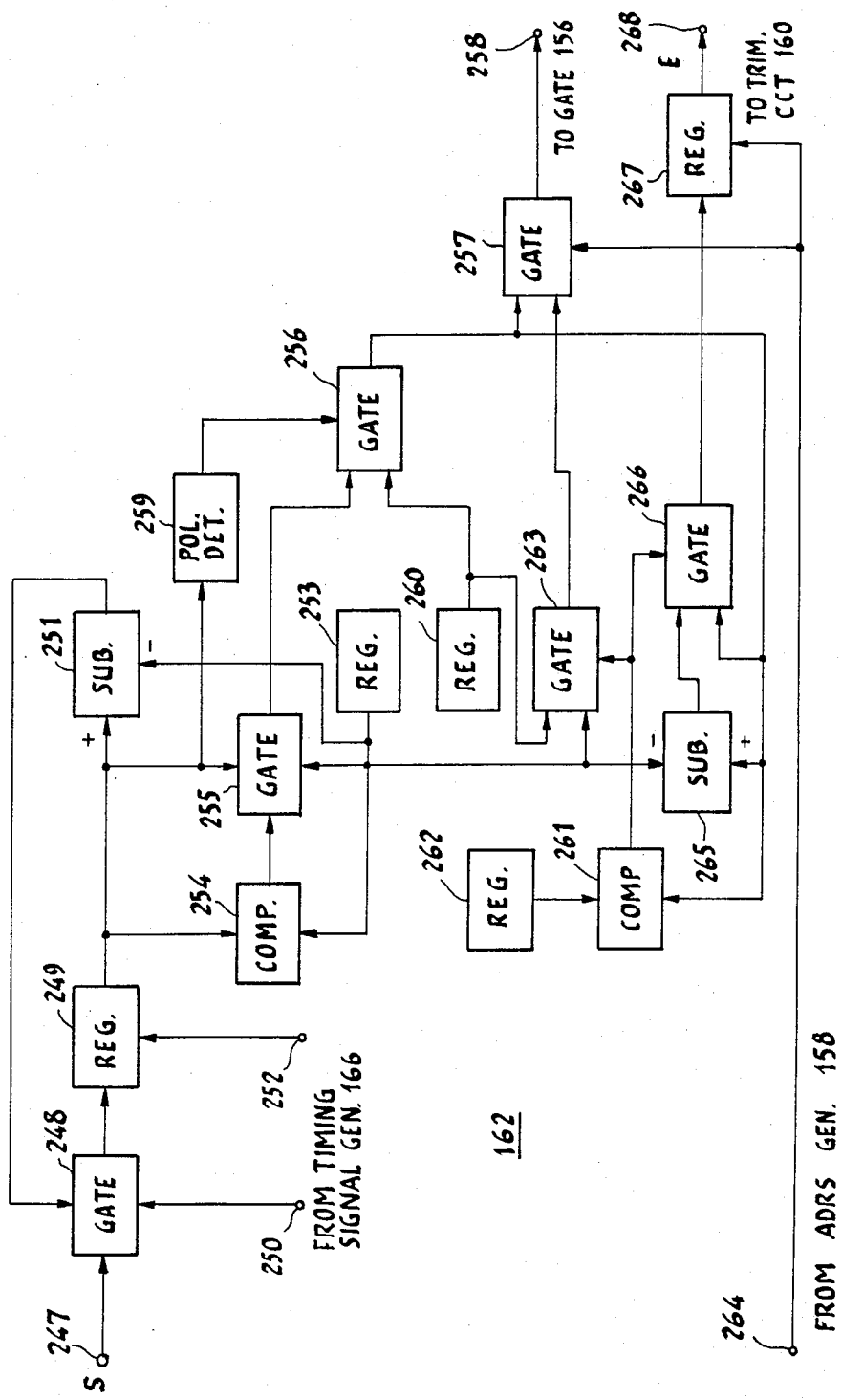
FIG. 29 is a block diagram of the data rearrangement and error detector circuit of FIG. 27.

FIG. 29 is an illustration of the details of the data rearrangement and error detection circuit 162.

The summation data S is applied through a terminal 247 to a gate 248 and thence to a register 249 and stored therein in response to a timing signal supplied to a terminal 250. In the absence of the timing signal at terminal 250, the gate 248 is switched to pass the output of a subtractor 251 to the register 249 instead of the summation signal. The register 249 is responsive to a timing signal on terminal 252 to store the input signal applied therein. The subtractor 251 provides subtraction of a constant value C supplied from a register 253 from the output of register 249. As a result, the output of the register 249 decreases successively by an amount C from the initial value in response to the appearance of a timing signal at terminal 252. A comparator 254 compares the constant value C with the output of the register 249 and enables a gate 255 when the register 249 output is equal to or greater than the constant C so that it passes the constant C datum therethrough and enables the gate 255 so that it passes the register 249 output when the latter is smaller than the constant C. The output of the gate 255 is coupled through gates 256 and 257 to an output terminal 258. A polarity detector 259 is connected to the output of register 249 to determine whether the register 249 output is positive or negative. If positive, the polarity detector 259 drives the gate 256 so that it allows the output of gate 255 to pass to the gate 257, and if negative the gate 256 is switched so that a datum indicating a "zero" value is allowed to pass from a register 260 to the gate 257. The output of gate 256 is also applied to a comparator 261 for making a comparison with a datum indicating a constant V supplied from a register 262. The output of the comparator 261 controls a gate 263 so that it passes the constant C datum from register 253 therethrough to the gate 257 when the output of gate 256 is greater than the constant value V of register 262 or passes the zero value of register 260 therethrough to the gate 257 when the output of gate 256 is not greater than V. The gate 257 is controlled in response to a timing signal applied to a terminal 264 to pass one of the outputs of gates 256 and 263 to the output terminal 258 which is coupled through gate 156 to the memory 157 of FIG. 27. This timing signal corresponds to the signal on line 163 of FIG. 27 and appears when the output of gate 263 is written into a storage location Pi,j of the memory 157. The constant C is applied from register 253 to a subtractor 265 which subtracts it from the output of gate 256 to derive a difference signal. The difference signal is applied to one input of a gate 266 which receives its second input from the output of gate 256. The gate 266 is controlled by the output of comparator 261 so that it passes the difference signal therethrough to a register 267 if the gate 256 output is greater than the constant V from register 262 or passes the gate 256 output to the register 267 if the gate 256 output is not greater than V. The output of the gate 266 represents an error correction signal E mentioned previously. The register 267 is responsive to the timing signal on terminal 264 to register the error correction signal E from gate 266 and delivers it through a terminal 268 to the trimming value generator 160 of FIG. 27.

Figure 30:
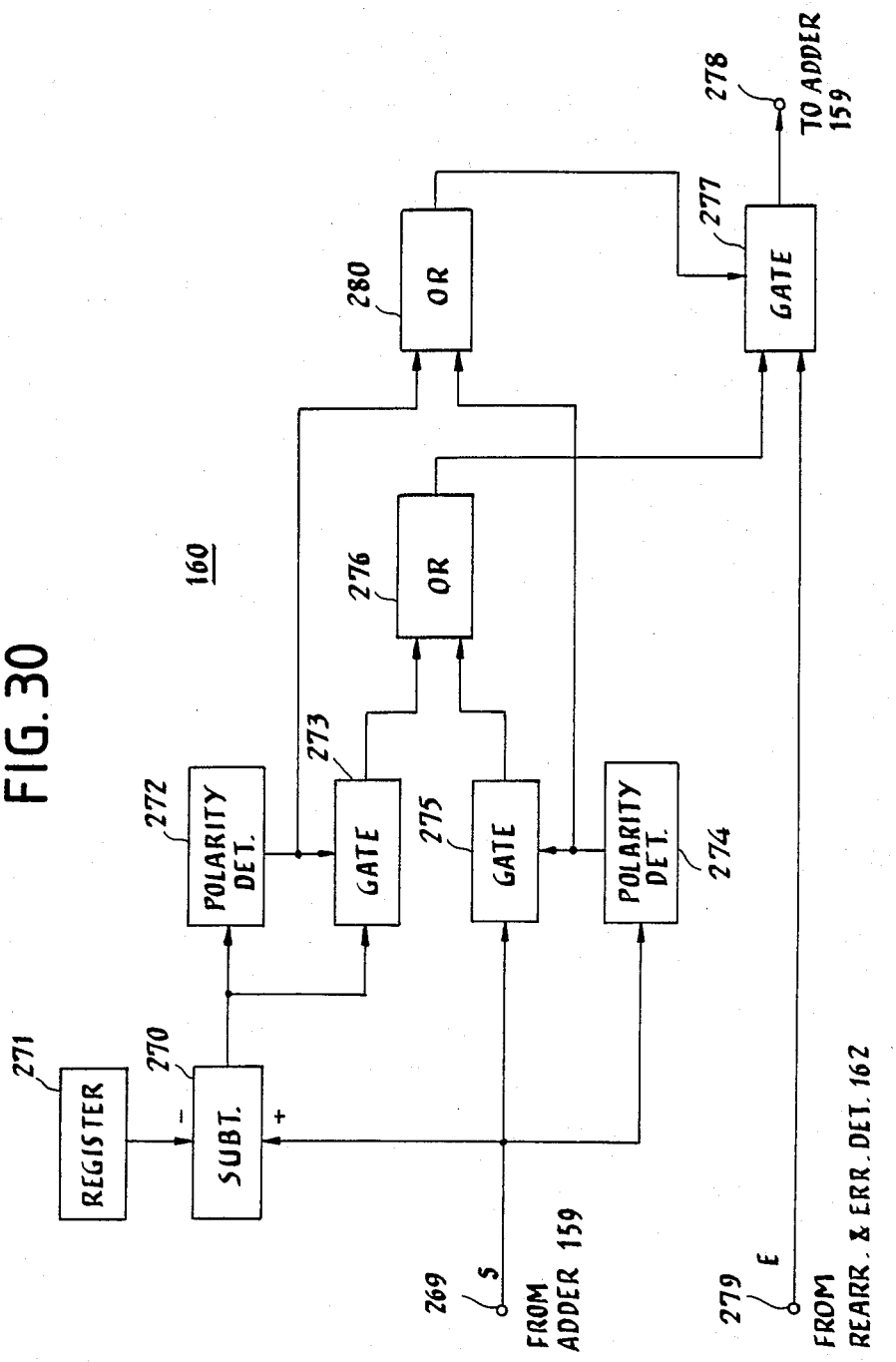
FIG. 30 is a block diagram of the trimming value generator of FIG. 27.

FIG. 30 is an illustration of the details of the trimming value generator 160 of FIG. 27. The summation data is applied to a terminal 269 and coupled to a subtractor 270. A constant value $C \times (m+1) \times (n+1)$ of the Step 4 which is mentioned previously is stored in a register 271 and applied to the subtractor 270 to subtract it from the summation data S. Since the present embodiment employs a $3 \times 3$ matrix, the constant value stored in register 271 equals $9 \times C$. The difference signal from the subtractor 270 is applied to a polarity detector 272 and also a gate 273. The polarity detector 272 detects when the difference signal is positive or zero and opens the gate 273 to pass the difference signal to an OR gae 276. The summation data S is also applied to a polarity detector 274 and a gate 275. The polarity detector 274 detects when the summation data is negative and drives the gate 275 to pass the negative summation value to the OR gate 276. The output of gate 276 is coupled to an input of a gate 277 which also takes its second input from a terminal 279 to which the error correction signal E from the output terminal 268 of FIG. 29 is applied. The gate 277 derives a gating control signal from the outputs of polarity detectors 272 and 274 via an OR gate 280 to pass the output of OR gate 276 to an output terminal 278 or passes the error correction signal E to the terminal 278 in the absence of the gating signal. The signal appearing at the terminal 278 is utilized in the adder 159 to be summed with the data supplied from the memory 157 before the scan window is shifted to the next.

As described above, the present invention provides scanning the original having a periodic pattern such as screen dot photographs, defining a scan window comprising a matrix of picture elements, summing and rearranging the matrix elements, detecting an error in a previous scan window, and summing the error with data in the next scan window. The resultant two-valued image eliminates moire patterns. The invention eliminates the need for high resolution scanning or varying scanning density according to the varying number of the original's screen dot number. The invention provides cost reduction, economy and excellent operability. The invention further ensures faithful reproduction of line drawings and characters while at the same time ensuring excellent halftone quality.

What is claimed is:

1. A method for processing a video signal, characterized by a first step of storing a video signal derived from each picture element of a scanned original into a video memory, a second step of establishing a scan window in said memory such that the scan window comprises M picture elements adjacent to each other (where M is a natural number), a third step of determining the total sum S of the signal levels of all of said picture elements in said scan window and determining N and A which satisfy the following formula:

$$S = C \times N + A$$

where C represents a given video signal level, N is an integer and $0 \leq A < C$, and a fourth step of identifying each of said picture elements in said scan window with an increasing or decreasing number in the order of signal level, and if in the decreasing order, transforming the signal levels of the picture elements #1 through #N to a signal level C, transforming the signal level of the picture element #(N+1) to a signal level A, transforming the signal levels of the picture elements #(N+2) through #M to a signal level zero, and if in the increasing order, transforming the signal levels of the #1 through #(M−N−1) picture elements to zero, transforming the signal levels of the #(M−N) picture elements to A, transforming the signal levels of the picture elements #(M−N+1) through #M to C, and repeating said second, third and fourth steps with respect to all the stored areas of said memory while shifting said scan window by a predetermined number of picture elements.

2. A method for processing a video signal, characterized by a first step of storing a video signal derived from each picture element of a scanned original into a video input memory and a video output memory, a second step of establishing an input scan window in said video input memory and establishing an output scan window in said video output memory such that each of said scan windows comprises M picture elements adjacent to each other (where M is a natural number), a third step of determining the total sum S of the signal levels of all of said picture elements in said scan window and determining N and A which satisfy the following formula:

$$S = C \times N + A$$

where C represents a given video signal level, N is an integer and $0 \leq A < C$, and a fourth step of identifying each of said picture elements in said scan window with an increasing or decreasing number in the order of signal level, and if in the decreasing order, transforming the signal levels of the picture elements #1 through #N to a signal level C, transforming the signal level of the picture element #(N+1) to a signal level A, transforming the signal levels of the picture elements #(N+2) through #M to a signal level zero, and if in the increasing order, transforming the signal levels of the #1 through #(M−N−1) picture elements to zero, transforming the signal levels of the #(M−N) picture elements to A, transforming the signal levels of the picture element #(M−N+1) through #M to C, and repeating said second, third and fourth steps with respect to all the stored areas of said video input and output memories while shifting said scan windows by a predetermined number of picture elements.

3. A method for processing a video signal, characterized by a first step of storing a video signal derived from each picture element of a scanned original into a video memory, a second step of defining a scan window in said memory such that the scan window comprises M adjacent picture elements (where M is a natural number) and deriving a total S of the signal levels of the picture elements in said scan window and an error correction value E while shifting the scan window by a predetermined number of picture elements, and a third step of:

(1) deriving N and A which satisfy $S' = C \times N + A$ if $0 \leq S \leq C \times M$ (where N is an integer and $0 \leq N \leq M$, and $0 \leq A < C$, and C represents a predetermined signal level), effecting a first transformation in the decreasing or increasing order of signal level by sequentially transforming the signal levels of the #1 through #N picture elements to C, transforming the signal level of the #(N+1) picture element to A, transforming the signal levels of the picture elements from #(N+2) to zero, effecting a second transformation by comparing the signal level $P_{1st}$ of the picture elements, which have undergone said first transformation and have been excluded from said scan window as a result of the shifting, with a predetermined binary level V which is equal to or greater than zero and smaller tha C, and transforming said $P_{1st}$ value to C as a value $P_{2nd}$ if $P_{1st}$ is greater than V and transforming said $P_{1st}$ to zero as $P_{2nd}$ if $P_{1st}$ is not greater than V, deriving a total of the difference between $P_{1st}$ and $P_{2nd}$ and retaining the total as said error correction value E for the shifted scan window;

(2) if 0 > S, transforming the signal levels of said M picture elements to zero, and retaining the total S as said error correction value E for said shifted scan window; and (3) if S > C×M, transforming the signal levels of said M picture elements to C, and retaining S−C×M as said error correction value E.

4. An apparatus for processing a video signal, characterized by means for storing a video signal derived from each picture element of a scanned original into a video memory, means for defining a scan window in said memory such that the scan window comprises M picture elements adjacent to each other (where M is a natural number), means for determining the total sum S of the signal levels of all of said picture elements in said scan window and determining N and A which satisfy the following formula:

$$S = C \times N + A$$

where C represents a given video signal level, N is an integer and $0 \leq A < C$, and means for identifying each of said picture elements in said scan window with an increasing or decreasing number in the order of signal level, and if in the decreasing order, transforming the signal levels of the picture elements #1 through #N to a signal level C, transforming the signal level of the picture element #(N+1) to a signal level A, transforming the signal levels of the picture elements #(N+2) through #M to a signal level zero, and if in the increasing order, transforming the signal levels of the #1 through #(M−N−1) picture elements to zero, transforming the signal levels of the #(M−N) picture elements to A, transforming the signal levels of the picture element #(M−N+1) through #M to C, and means for shifting said scan window over said stored area of said memory by a predetermined number of picture elements.

5. An apparatus for processing a video signal, characterized by means for storing a video signal derived from each picture element of a scanned original into a video input memory and a video output memory, means for defining an input scan window in said video input memory and defining an output scan window in said video output memory such that each of said scan windows comprises M picture elements adjacent to each other (where M is a natural number), means for determining the total sum S of the signal levels of all of said picture elements in said scan window and determining N and A which satisfy the following formula:

$$S = C \times N + A$$

where C represents a given video signal level, N is an integer and $0 \leq A < C$, and a fourth step of identifying each of said picture elements in said scan window with an increasing or decreasing number in the order of signal level, and if in the decreasing order, transforming the signal levels of the picture elements #1 through #N to a signal level C, transforming the signal level of the picture element #(N+1) to a signal level A, transforming the signal levels of the picture elements #(N+2) through #M to a signal level zero, and if in the increasing order, transforming the signal levels of the #1 through #(M−N−1) picture elements to zero, transforming the signal levels of the #(M−N) picture elements to A, transforming the signal levels of the picture element #(M−N+1) through #M to C, and means for shifting said input and output scan windows in said stored areas of said video input and output memories by a predetermined number of picture elements.

6. An apparatus for processing a video signal, characterized by first means for storing a video signal derived from each picture element of a scanned original into a video memory, second means for defining a scan window in said memory such that the scan window comprises M adjacent picture elements (where M is a natural number), third means for deriving a total S of the signal levels of the picture elements in said scan window and an error correction value E while shifting the scan window by a predetermined number of picture elements, and fourth means for:

(1) deriving N and A which satisfy $S' = C \times N + A$ if $0 \leq S \leq C \times M$ (where N is an integer and $0 \leq N \leq M$, and $0 \leq A < C$, and C represents a predetermined signal level), effecting a first transformation in the decreasing or increasing order of signal level by sequentially transforming the signal levels of the #1 through #N picture elements to C, transforming the signal level of the #(N+1) picture element to A, transforming the signal levels of the picture elements from #(N+2) to zero, effecting a second transformation by comparing the signal level $P_{1st}$ of the picture elements, which have undergone said first transformation and have been excluded from said scan window as a result of the shifting, with a predetermined binary level V which is equal to or greater than zero and smaller tha C, and transforming said $P_{1st}$ value to C as a value $P_{2nd}$ if $P_{1st}$ is greater than V and transforming said $P_{1st}$ to zero as $P_{2nd}$ if $P_{1st}$ is not greater than V, deriving a total of the difference between $P_{1st}$ and $P_{2nd}$ and retaining the total as said error correction value E for the shifted scan window;

(2) if 0 > S, transforming the signal levels of said M picture elements to zero, and retaining the total S as said error correction value E for said shifted scan window; and (3) if S > C×M, transforming the signal levels of said M picture elements to C, and retaining S−C×M as said error correction value E.

* * * * *